(12) United States Patent
Ono et al.

(10) Patent No.: US 6,295,487 B1
(45) Date of Patent: Sep. 25, 2001

(54) HYBRID VEHICLE AND METHOD OF CONTROLLING THE TRAVEL OF THE VEHICLE

(75) Inventors: Masao Ono, Yokohama; Nobuhito Ohnuma, Atsugi; Jun Morimoto, Atsugi; Hiroko Yoshikawa, Atsugi; Akifumi Kurita, Atsugi; Osamu Watanabe, Atsugi, all of (JP)

(73) Assignee: Tokyo R & D Co., Ltd., Tokyo (JP)

( * ) Notice: Subject to any disclaimer, the term of this patent is extended or adjusted under 35 U.S.C. 154(b) by 0 days.

(21) Appl. No.: 09/508,580
(22) PCT Filed: Jul. 19, 1999
(86) PCT No.: PCT/JP99/03880
§ 371 Date: Mar. 14, 2000
§ 102(e) Date: Mar. 14, 2000
(87) PCT Pub. No.: WO00/05094
PCT Pub. Date: Feb. 3, 2000

(30) Foreign Application Priority Data

| Jul. 21, 1998 | (JP) | 10-222270 |
| Nov. 13, 1998 | (JP) | 10-324172 |
| Dec. 25, 1998 | (JP) | 10-368664 |
| Dec. 28, 1998 | (JP) | 10-373334 |

(51) Int. Cl.[7] ............................ G05D 3/00; B60L 9/00
(52) U.S. Cl. .................. 701/22; 701/52; 701/71; 701/82; 180/65.3; 180/165
(58) Field of Search ............... 701/22, 52, 67, 701/71, 72, 73, 74, 82, 90; 180/165, 65.1, 65.2, 65.3, 65.7; 303/20

(56) References Cited

U.S. PATENT DOCUMENTS 5,450,324 * 9/1995 Cikanek ........................ 701/22
5,815,824 * 9/1998 Saga et al. ..................... 701/22

\* cited by examiner

Primary Examiner—William A. Cuchlinski, Jr.
Assistant Examiner—Yonel Beaulieu
(74) Attorney, Agent, or Firm—Kanesaka & Takeuchi

(57) ABSTRACT

A hybrid vehicle (1) including an internal combustion engine and electric motors and selectively uses them as a running drive source according to a running state. When one of wheels (5) driven by an engine (7) skids to rotate excessively, a motor (13) connected to that wheel is caused to make a regenerative operation to remedy the skid of the wheel, and running traction made insufficient due to the skid is compensated by driving another wheel (4) by a motor (12) of another wheel by using electric energy recovered by the regenerative operation.

20 Claims, 25 Drawing Sheets

HYBRID VEHICLE AND METHOD OF CONTROLLING THE TRAVEL OF THE VEHICLE

TECHNICAL FIELD

The present invention relates to a hybrid vehicle which has an internal combustion engine and electric motors and has its energy utilization efficiency enhanced so to improve its running efficiency and performance.

BACKGROUND ART

Recently, a hybrid vehicle which reduces an amount of carbon dioxide emissions and is practical is attracting attention.

Specifically, the conventional internal combustion engine used for vehicles such as automobiles is low in a total efficiency because it is operated in a wide load range and a wide range of the number of rotations of the engine. And when the vehicle is temporarily stopped, the engine is generally not fully stopped but kept in an idling state because it is desired that the vehicle can be started immediately, a trouble of restarting the engine is omitted and the like. And, fuel consumption while idling and exhaust gas produced as a result are issues not negligible in view of environment and energy saving. Particularly, such problems are increasing in city areas where traffic jams are often caused.

Furthermore, when a running speed is largely changed, namely when the vehicle is abruptly started or abruptly accelerated from a relatively slow speed, the engine efficiency may be lowered and the fuel consumption is degraded.

Therefore, a hybrid system which is succeeded and developed from a drive system which combines different types of power used for aircraft, ships and the like has lately attracted attention.

This running system is configured to have a conventional internal combustion engine and an electric motor which is a clean power source within a vehicle and to utilize the advantages of both of them to their maximum extent and also to compensate their disadvantages.

There have been proposed a series hybrid which uses the above two drive sources in series and a parallel hybrid using them in parallel.

There is also proposed a hybrid system which is provided with a distribution mechanism which can use for example a planetary gear mechanism to variably distribute the engine output into two systems as desired.

This system is designed to operate the engine in its best condition in view of efficiency, namely fuel consumption, and if the engine output is excessive in view of a running condition, the excess output of the engine is converted into electrical energy by using the electric motor as a generator and recovered and accumulated in a battery, and if the engine output is insufficient, the insufficient traction is supplemented by the electric motor.

But, production of the planetary gear mechanism requires high precision and it is expensive. And the running traction required depending on running conditions is always based on a balance of the driving force of the engine and the driving force recovered or added by the motor. Therefore, a variety of controls, particularly motor control, becomes complex.

And, the conventional engine vehicle generally has a traction control for controlling to have an optimum traction depending on a road surface condition and to improve gripping performance of the drive wheels so that the drive wheels do not skid (spin) or the vehicle does not become unstable to run due to a bad road or the like.

Specifically, when the vehicle is running along a snowed road or a slippery road surface due to freezing, the drive wheels skid, and its running control is disabled or it cannot run depending on a level of skid or a running posture. Particularly, such tendencies are enhanced when the vehicle is started, accelerated or sharply cornered.

For example, feedback control is performed to decrease a throttle valve opening based on a slip ratio of the drive wheels, braking control of the drive wheels is performed to properly control the driving force of the vehicle so to decrease the skids of the drive wheels.

But, the traction control based on such a mechanical structure delays to respond and is not satisfactory for controlling.

The braking control of the drive wheels is not good in view of energy efficiency. In other words, kinetic energy decreased by braking the drive wheels is lost completely.

Furthermore, when any of the wheels skids in the same way as above, a gripping state of that wheel is resumed normal by the aforesaid skid remedying operation, but a total of running driving forces of all the drive wheels becomes lower than before, and a drive balance is lost. Therefore, the running control is not lost but the running performance of the vehicle is lowered.

Accordingly, it is an object of a first invention to provide a hybrid vehicle which can improve energy efficiency and prevent the running performance from lowering to remedy poor behavior of the vehicle at occurrence of a skid.

This type of hybrid vehicle can run in three ways by the engine only, by the electric motors only and by the engine as well as the electric motors.

The conventional hybrid vehicle generally has an electric motor disposed between the clutch of the engine and the transmission or between the engine and the clutch to transmit a combined force of the engine and electric motor outputs to the drive wheels through the transmission to rotate them.

Therefore, the operations of the transmission and the clutch are common between the engine and the electric motor and almost free from making an improper operation.

Recently, there is developed a hybrid vehicle in which the drive system of the electric motor adopts another transmission line. In other words, the drive system of the engine is connected to the drive wheels through the clutch, the transmission and the like, while the drive system of the electric motor is connected at some midpoint thereof to the engine drive system or directly connected to the drive wheels.

In the hybrid vehicle which has the drive system of the electric motor and connected to the drive wheels through another reduction gear, its operations (selection of forward, reverse and gear change ratio) are different in the running by the engine only, the running by the engine and the electric motor, and the running by the electric motor only. Therefore, it may require two types of operation systems, and those operation systems are sometimes operated erroneously.

Therefore, it is an object of a second invention to provide a hybrid vehicle which can make operations (selection of forward, reverse and gear change ratio) of an engine and electric motors without making a mistake, and the operations can be made rationally, e.g., while the vehicle is running.

The conventional engine-mounted vehicle uses a so-called traction control system (hereinafter called TCS) to control a spin when it is caused as the drive wheels skid due to some reasons such as abrupt start on a road having a low coefficient of friction, a bad road or the like.

TCS controls the engine output or the brakes to control the drive wheels by judging that the drive wheels are spinning in view of a difference caused due to an abrupt increase of the drive wheel speed from the vehicle body speed presumed from the driven wheel speed, back-and-forth acceleration or the like.

Specifically, the engine control system is provided with a throttle (hereinafter called a first throttle) which responds to the accelerator pedal operated by the driver and also a throttle (hereinafter called a second throttle) operated based on the result judged by an arithmetic unit. The second throttle is operated when the speed of the drive wheels exceeds the engine control setting speed determined in view of a difference of speed or the like from the vehicle body speed.

A control system of braking has a brake (hereinafter called a second brake) operated on the basis of a result judged by the arithmetic unit in addition to a foot brake operated by the driver. The second brake is operated when the speed exceeds a brake control setting speed which is determined independent of the engine control setting speed.

And, when the driver opens the first throttle and the drive wheels have skids, the arithmetic unit judges that the drive wheels are spinning if the speed of the drive wheels exceeds the engine control setting speed and lowers the engine output by means of the second throttle to decrease the speed of the drive wheels so to remedy the spins.

And, when the drive wheels have heavy skids, namely the drive wheel speed exceeds the engine control setting speed and the brake control setting speed, a brake fluid pressure of the pertinent drive wheel is increased to control the drive wheel (operation of the second brake).

In addition to the control using the second throttle, there are also available a method of controlling by the arithmetic unit by means of throttle-by-wire and a method of controlling an amount of fuel injection.

Recently, there is also used a function which is called a vehicle stability control (hereinafter called VSC) which detects a lateral acceleration (yaw rate) of the vehicle while steering and turning, changes the torque to the right and left drive wheels or brakes before the vehicle spins in the same way as the above traction control, thereby controlling the stability of the vehicle.

It is also considered to use the above TCS or VSC for the hybrid vehicle. When the engine output is controlled by the TCS or VSC, there is a disadvantage that there is a time lag between the application of control to the throttle and fuel injection and the actual reaction of output due to a factor such as inertia or the like. Therefore, before using the conventional TCS or VSC, it is desired to use the electric motor to control spin of the drive wheel or to control to prevent the spin.

Particularly, when the brake control is made by the TCS, a reaction speed to the control is faster than the engine control, but when a situation to reach the brake control setting speed is continuously made, the brakes generate heat, possibly resulting in fading. In other words, energy is abandoned as heat and a sufficient braking force may not be obtained. Therefore, its use is limited.

Accordingly, it is an object of a third invention to provide a hybrid vehicle and a method of controlling its running which can improve energy efficiency and prevent the running performance from lowering so to make the spin control or spin prevention control of the drive wheels by using an electric motor, both an electric motor and TCS or VSC, or an electric motor before TCS or VSC.

As described above, this type of hybrid vehicle is generally provided with three types of running patterns such as running by an engine only, an electric motor only, and an engine and an electric motor.

To run by the engine, the rotations of the engine are transmitted to the transmission through the clutch, and the drive wheels are driven to rotate by the rotation force converted by the transmission. And, to run by the electric motor or to run by the electric motor and the engine, the rotation torque is increased by increasing the current value of the electric motor according to a stepped-on quantity of the accelerator pedal by the driver, namely an accelerator opening angle.

And, the manual transmission of the conventional hybrid vehicle is generally the one used for an ordinary engine vehicle.

When such a hybrid vehicle which is running by the engine (including the combined use of the electric motor) does not use the engine to go down a long downward slope, the engine brake is generally operating. Therefore, the kinetic energy of the vehicle is partly lost as a mechanical loss of the engine.

Accordingly, it is an object of a fourth invention to provide a hybrid vehicle which can avoid a loss of the kinetic energy.

In the conventional hybrid vehicle, the power transmission of the electric motor is generally effected upstream of the clutch, namely the power transmission is performed through the differential gear. Therefore, the space for mounting the electric motor must be secured, and the number of components to some extent are required.

Therefore, the fourth invention aims to provide a hybrid vehicle that the power transmission of the electric motor is not effected through the differential gear but in the vicinity of the drive wheels so to save the space for mounting the electric motor and to decrease the number of components.

DISCLOSURE OF THE INVENTION

The first invention is a hybrid vehicle including an engine operated by burning a fuel and electric motors operated by electric energy, characterized in that at least a pair of right and left wheels are linked with both an engine drive system and a motor drive system; and when either of the wheels skids to rotate excessively while the vehicle is driven by the engine, the motor connected to that wheel is made to effect regenerative operation to brake it so to remedy the skid of the wheel.

By configuring as described above, when any of the running wheels driven by the engine causes skid to rotate excessively while the engine is run, the motor connected to that running wheel is made the regenerative operation, so that the speed is decreased to remedy the skid of the running wheel.

And, this operation is an electrical operation of the electric motor, excelling in quick response and enabling to take secure measures. Therefore, the skid can be remedied securely and quickly. Thus, stable running can be made when the vehicle is driven by the engine at a relatively high speed, the running performance can be improved, and it is favorable in view of safety.

The first invention is also the hybrid vehicle, wherein running traction which becomes insufficient due to the skid is supplemented by driving the other wheel by the motor by using electric energy recovered by the regenerative operation.

Thus, since the traction lost by the skid is supplemented by driving the other drive wheel by the motor by using the recovered electric energy, the energy efficiency of the hybrid vehicle can be improved, and the running performance can be prevented from being lowered. In other words, in addition to the simple remedy of the skid, it becomes possible to drive the other running wheel by the motor to avoid the running instability due to the occurrence of the skid.

And the first invention is the hybrid vehicle, wherein the motor driving force is distributed to compensate the lowered traction balance of the respective wheels caused by the skid.

As described above, the running wheel driven by the motor is selected depending on a vertical load balance owing to the loaded condition of the vehicle and the running condition of the vehicle at the occurrence of the skid, or the respective outputs of the motor driving forces of the plurality of running wheels are adjusted to redistribute the running driving force so to enable the prevention of the lowering of the running balance.

And, the first invention is the hybrid vehicle according to the invention of any one of claims 1 to 3, wherein the motor is provided to be rechargeably driven by the engine, and the wheel linked to the engine running drive system is disengageable from the engine.

By configuring as described above, the battery can be recharged any time by the engine regardless of the running condition of the vehicle.

In other words, when the vehicle is stationary, the battery can be recharged by driving only the motor by the engine for recharging without running the vehicle by the disengaging operation.

And, where the vehicle is driven by the motor only, the recharging can be made by the aforesaid engine drive, and the other electric motor system for driving to run and the engine/recharging motor system can be disengaged, and both of them can be made independent from each other without interfering to each other, so that their respective operation functions can be exhibited sufficiently.

Besides, when recharging as described above, the driving conditions optimum for the engine, the motor and the battery, namely the fuel consumption ratio of the engine, the electricity generation ratio of the motor and the recharging ratio of the battery, are taken into consideration, so that the recharging efficiency can also be improved.

As described above, according to the first invention, there can be provided a hybrid vehicle which is improved its running stability, cruising range and the like on a bad road and has an overall high performance.

A second invention is a hybrid vehicle including an engine operated by burning a fuel and electric motors operated by electric energy, characterized in that a transmission includes a first operation section to change gears of at least an engine running system and a second operation section to switch between forward and backward drives of an electric motor running system; both the operation sections have a neutral lever position formed commonly; and an operation lever is disposed to be operable in both the operation sections so to alternatively switch between the engine running system and the electric motor running system.

Thus, the engine running system and the electric motor running system are alternatively switched by the operation lever, so that when one of the engine running system and the electric motor running system is operated, an erroneously operating the other system can be avoided.

The second invention is also the hybrid vehicle, wherein a seesaw switch, which is switched when the operation lever is passed by, is provided between the neutral lever position of the engine running system and the neutral lever position of the electric motor running system in the commonly formed neutral lever position.

Thus, by virtue of the seesaw switch, the switching is not made by the seesaw switch unless the operation lever passes, and the alternative switching between the engine running system and the electric motor running system can be made more securely.

And, the second invention is the hybrid vehicle, wherein the operation lever is provided with a switch for starting the engine.

Where the engine running system and the electric motor running system are alternatively switched by the single operation lever, in shifting to the engine running system, the shift and the engine starting operation can be made together because the engine starting switch is mounted on the operation lever, so that the operation is facilitated and rational without waste.

The second invention is also the hybrid vehicle, wherein the engine running system is provided with a clutch, the seesaw switch is switched by shifting the operation lever from the first operation section to the second operation section to stop the engine and to fix the clutch in an open state, and the seesaw switch is switched by shifting the operation lever from the second operation section to the first operation section to release the clutch from the open state.

In the case of the manual transmission with the clutch provided, it is necessary to have the clutch in the open state to shift from the engine running system to the electric motor running system. As in this second invention, the engine is stopped by switching the seesaw switch and the clutch is fixed in the open state, so that it is convenient that the driver does not need to separately operate to have the clutch in the open state. And, to change from the electric motor running system to the engine running system, the seesaw switch is switched by the reverse operation to release the clutch from the fixed open state. Therefore, it is also convenient because the driver does not need to operate to release the clutch from the fixed state.

And the second invention is the hybrid vehicle, wherein even when the operation lever is shifted from the second operation section to the first operation section, the operation lever cannot be shifted into the first operation section because the seesaw switch is in the fixed state when the engine is not operating.

Thus, when the operation lever is shifted from the second operation section into the first operation section, namely when the electric motor running system is changed to the engine running system, the operation lever cannot be shifted into the first operation section because the seesaw switch is in the fixed state when the engine is not operated. Therefore, the shift of the operation lever into the first operation section when the engine is not operated is avoided, and safety can be secured.

And, the second invention is the hybrid vehicle, wherein the engine running system is provided with the clutch, and the electric motor is turned off when the clutch is in an open state.

In the gear change operation in the first operation section to change the gears of the engine running system, when the manual transmission with the clutch is operated by the driver who steps on the clutch pedal and also the accelerator pedal, it is dangerous if the vehicle is accelerated by the driving force of the electric motor, because the operation is different from that of the ordinary automobile. Therefore, the drivability of the ordinary automobile is retained by turning off the electric motor if the driver steps on the clutch pedal and the accelerator pedal.

The second invention is also the hybrid vehicle, wherein the engine running system is provided with a semi-automatic transmission or a full automatic transmission, and the electric motor is operated by operating the accelerator pedal even if the clutch is in the open state.

The semi-automatic transmission does not have the clutch pedal which is operated by the driver, and when the operation lever is operated by the driver, the clutch is automatically engaged or disengaged. And, the automatic transmission does not have the clutch pedal to be operated by the driver, and the gear change operation is automatically effected according to the operation of the accelerator pedal by the driver and the speed. In the above operations, the electric motor can be operated through the accelerator pedal while the clutch operation and the gear change operation are automatically effected, and the driving force by the electric motor can be kept applied to the vehicle during the gear change. Therefore, running according to a stepped-on quantity of the accelerator pedal can be maintained.

As described above, the second invention provides the hybrid vehicle that the engine running system and the electric motor running system are alternatively switched, so that an erroneous operation can be avoided, and safety can be improved further.

A third invention is a hybrid vehicle including an engine operated by burning a fuel and electric motors operated by electric energy, characterized by a wheel speed sensor connected to each driven wheel; and an arithmetic unit which calculates a vehicle speed from a signal output from the wheel speed sensor, calculates a wheel speed of the drive wheel from the number of rotations of the electric motor, and controls output of the electric motor with a predetermined electric motor output control starting speed and electric motor regenerative control starting speed determined as thresholds.

And the third invention is a method of controlling running of a hybrid vehicle having an engine operated by burning a fuel and electric motors operated by electric energy, characterized in that the vehicle has a wheel speed sensor connected to each driven wheel and an arithmetic unit which calculates a vehicle speed from a signal output from the wheel speed sensor, calculates a wheel speed of the drive wheel from the number of rotations of the electric motor, and controls output of the electric motor with a predetermined electric motor output control starting speed and electric motor regenerative control starting speed determined as thresholds; and output control of the electric motor is started when the engine throttle is opened by the driver, a vehicle speed estimated by calculating and the wheel speed of the drive wheel are compared, and when it is judged that the drive wheel is spinning, output of the electric motor which drives that drive wheel is controlled.

According to the above inventions, when the vehicle is driven by the electric motor or by both the electric motor and the engine, and if the drive wheels exceed a predetermined speed to spin, powering (rotation output control) of the electric motor connected to the drive wheels is stopped or it is controlled to make the regenerative operation of the electric motor, and a speed reduction operation is performed to remedy the spin of the drive wheels.

The output and load of the electric motor can be determined from the number of rotations and the input electric power, so that estimation accuracy is high and control accuracy can be enhanced.

Besides, even if the driving force is continuously controlled, the control can be made stably because there is no minus factor such as generation of heat.

When the regeneration of electric power is used, the energy efficiency of the vehicle is improved because excess energy can be recovered.

As described above, the operation according to the above inventions is an electrical operation of the electric motor, so that the response is quick, and the secure measures can be taken. Thus, the spin can be remedied securely and quickly. Therefore, when the engine is driven at a relatively high speed, stable running can be made, running performance can be improved, and it is favorable in view of safety.

And, the third invention is the method of controlling running of a hybrid vehicle, wherein the vehicle is provided with a throttle control device for controlling output of the engine and a second throttle controlled by the throttle control device disposed upstream of the throttle operated by the driver, having a predetermined engine control starting speed and brake control starting speed determined as thresholds; and the vehicle speed estimated by calculating and the wheel speed of the drive wheel are compared, and when it is judged that the drive wheel is spinning and the wheel speed of the drive wheel exceeds the engine control starting speed or the brake control starting speed, the second throttle is controlled or the braking control of the drive wheel is performed.

This invention is configured by further adding TCS, so that the spin can be controlled more securely, and the advantages of either one of controls can be used as required. Thus, it is very convenient.

The third invention is also the method of controlling running of a hybrid vehicle, wherein the electric motor output control starting speed, the electric motor regenerative control starting speed, the engine control starting speed and the brake control starting speed are sequentially provided in the order of increasing speed.

Thus, since the electric motor output control starting speed, the electric motor regenerative control starting speed, the engine control starting speed and the brake control starting speed are sequentially provided in the order of increasing speed, the control of spin of the driven wheels is effected by the electric motor before the TCS, so that the energy efficiency is further improved, and the running performance can be prevented from lowering.

And, the third invention is a hybrid vehicle including an engine operated by burning a fuel and electric motors operated by electric energy, which is characterized by a yaw sensor for detecting a lateral acceleration of the vehicle; and an arithmetic unit for controlling output of the electric motors with a predetermined electric motor output control starting yaw sensor output and electric motor regenerative control starting yaw sensor output which are determined as thresholds.

The third invention is also a method of controlling running of a hybrid vehicle having an engine operated by burning a fuel and electric motors operated by electric energy, characterized in that the vehicle is provided with a yaw sensor for detecting a lateral acceleration of the vehicle and an arithmetic unit for controlling output of the electric motors with the predetermined electric motor output control starting yaw sensor output and electric motor regenerative control starting yaw sensor output, which are determined as thresholds; and output control of the electric motors is started when the engine throttle is opened by the driver, and output of the electric motors driving the drive wheels is controlled when it exceeds the thresholds.

According to the above inventions, when the vehicle is running by the electric motor or by both the electric motor and the engine, if the vehicle runs at a speed exceeding a predetermined cornering acceleration, powering (rotation output control) of the electric motor connected to that drive wheel is stopped, or it is controlled to make the regenerative operation of the electric motor, so that the deceleration operation is performed to prevent the drive wheel from spinning.

Since the operation according to the third invention is an electrical operation of the electric motor, its response is quick, and secure measures can be taken. Thus, the spin can be prevented securely and quickly. Accordingly, when the vehicle is driven by the engine at a relatively high speed, the vehicle can run stably, and its running performance can be improved. It is also favorable in view of safety.

As described above, according to the third invention, even when the vehicle starts abruptly on a road having a low coefficient of friction, runs a bad road or turns, its running safety, cruising range and the like are improved. Thus, a hybrid vehicle having an overall high performance and its running control method can be obtained.

A fourth invention is a hybrid vehicle including an engine operated by burning a fuel and electric motors operated by electric energy, and a clutch disposed between the engine and a transmission, which is characterized in that a one-way clutch is provided next to the clutch; and the one-way clutch transmits engine torque in a drive direction only.

Thus, when the one-way clutch which transmits the engine torque in the drive direction only is provided, the route to transmit the rotations of the wheels to the engine is blocked by the one-way clutch, so that the kinetic energy of the vehicle can be recovered to its maximum by the regenerative brake function of the electric motor, and the kinetic energy is not lost as a mechanical loss of the engine as prior art. As a result, the energy efficiency can be improved.

The fourth invention is also the hybrid vehicle, wherein the shaft of the drive wheel is linked with a CV joint (constant velocity joint) and a CV joint housing (constant velocity joint housing), and a power transmission gear is fitted to the CV joint housing to transmit a driving force from the electric motor to the drive wheel through the power transmission gear.

Thus, since the transmission route from the electric motor is the CV joint housing, the motor torque can be transmitted to the drive shaft in the distance as short as possible, and the place where the electric motor is mounted can be determined with high flexibility.

Therefore, the transmission of the power of the electric motor can be effected in the vicinity of the drive wheels without through a differential gear. Thus, the space for mounting the electric motor can be saved, and the number of components can be decreased. And, the rotation of the electric motor corresponds to that of the wheel in a ratio of one to one, so that the control (e.g., ABS, TCS, etc.) of the rotations of the wheel by the electric motor attached to each wheel is facilitated.

And, the fourth invention is the hybrid vehicle, wherein an intermediate gear is interposed between the power transmission gear and the electric motor to decrease the number of rotations of the electric motor.

Generally, the number of rotations of the electric motor is larger than that of the wheel, so that it is preferable to have a gear reduction mechanism as in this invention.

And, the fourth invention is the hybrid vehicle, wherein a parking gear is provided downstream of the one-way clutch, and a parking mechanism having a hook for engaging with or disengaging from the parking gear is provided.

By providing the one-way clutch as described above, a function to stop the vehicle when it is parked is lowered. But, by providing the parking gear and the parking mechanism which has the hook to engage with or disengage from the parking gear according to this invention, the parking gear is fixed by the hook to prevent the rotations of the shaft and the wheels linked thereto. Thus, the function of the parking brake can be provided.

BEST MODES FOR CARRYING OUT THE INVENTION

Now, a first embodiment of a first invention will be described with reference to FIG. 1 and FIG. 2.

Figure 1:
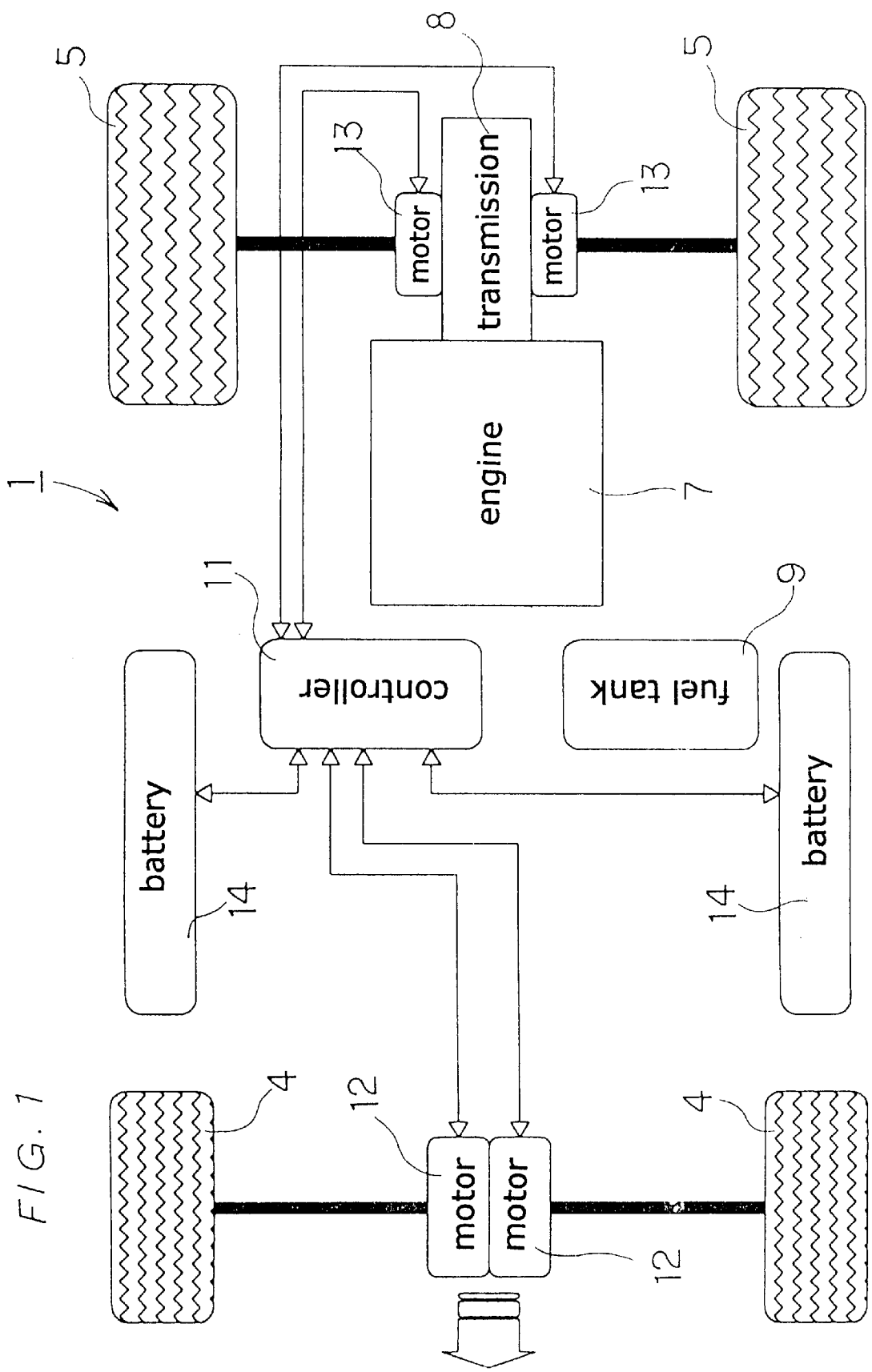
FIG. 1 is a plan view showing a schematic general structure of an electric four-wheel vehicle as an example of the hybrid vehicle according to a first embodiment of a first invention.

As shown in FIG. 1, a hybrid vehicle 1 of this embodiment has running wheels (front wheels 4 and rear wheels 5), which are suspended at the front and rear of the main frame of an unillustrated vehicle body in the same way as a four-wheel vehicle which is one of general vehicle types. The front wheels 4 are steered by the driver through the steering wheel, and the rear wheels 5 are rotationally driven to run the vehicle. As its drive source, an engine drive system based on a conventional internal combustion engine 7 and an electrical drive system based on electric motors 12, 13 are mounted and switched or operated in cooperation by a hybrid system controller 11 (hereinafter called the controller).

In other words, it is basically designed that when the vehicle is started or running at a low speed, the electric motors 12, 13 are used as the main drive source, and the engine 7 is used as the main drive source during stable cruising.

Selection of either the electric motors 12, 13 or the engine 7 as the main drive source and a gear shifting operation according to the vehicle speed during the engine drive are made by the controller 11.

This hybrid vehicle 1 of this embodiment monitors the rotations of the respective wheels while the vehicle is being driven by the engine 7, and if any of the wheels skids due to excessive rotations, decreases the number of rotations of that wheel to remedy the skid and recovers the decreasing rotary drive energy by regenerative electric power generation. Furthermore, the recovered electric energy is used to drive the other wheels so to compensate the driving force for the lowered running caused by the wheel skid.

Specifically, this engine drive system includes the internal combustion engine 7 mounted at the rear position of the vehicle main frame, a transmission 8 connected to an output shaft of the engine 7 via a one-way clutch, rear wheel shafts connected to a transmission output shaft of the transmission 8 and the rear wheels 5. A fuel tank 9 and unillustrated engine auxiliaries such as a fuel pump, piping for supplying a fuel to the engine 7 and an engine cooling drive are arranged in the periphery of the engine 7.

Besides, the electric drive system includes the electric motors 12, 13 which are separately mounted for the respective wheels and batteries 14 which supply electric energy to the respective electric motors 12, 13. And, a flow of the electric energy is controlled by the controller 11.

The electric motors 12, 13 are DC brushless motors having excellent durability and reliability, and mounted to be always in mechanical connection with the shafts of the respective running wheels directly or through a reduction gear.

The respective electric motors 12, 13 in use have high output performance similar to that of a single motor mounted on an ordinary hybrid vehicle and an allowance enough to compensate to provide sufficient traction even when any of the wheels skids as will be described afterward.

Besides, the electric motors 12, 13 have, as their operation modes, a drive mode for externally outputting a driving force, a free-run mode for not outputting the driving force and a regenerative mode for operating as an electric power generator by absorbing an external driving force.

Specifically, the drive mode is an output operation of a general electric motor and externally outputs rotation torque according to the electric power supplied for driving supplied.

In the free-run mode, the motors 12, 13 are not supplied with electric power for driving at all and the vehicle is in a motor free-run state, or the motors 12, 13 are in a state of keeping the rotations by being supplied with electric power just enough to keep a rotation speed just before it. In either of these cases, the motors 12, 13 are controlled not to output a driving force externally.

The regenerative mode is an electric power generating operation same as that of a general generator. It converts kinetic energy into electric energy to output electric power according to an external driving force. In other words, in the regenerative mode, electricity generated from the motors 12, 13 is controlled to adjust the driving force absorbed from the outside, namely the wheels 4, 5 to which the motors 12, 13 are connected, so that the rotation speeds of the wheels 4, 5 can be decreased as desired.

The wheels 4, 5 are respectively provided with separate dedicated rotation sensors (not shown) which keep monitoring the number of rotations of the respective wheels 4, 5 so to enable judgment which wheel has caused a skid to rotate excessively.

Specifically, these rotation sensors are electrically connected to the controller 11, and when the number of rotations of a particular wheel is extremely different from the average value of the number of rotations of all the wheels or an appropriate number of rotations calculated from a sensor which directly detects a running speed of the vehicle with respect to a road surface, the sensor of the pertinent wheel judges that it is skidding to rotate excessively.

And, when the hybrid vehicle 1 having the above structure is in a low speed range including the time when the hybrid vehicle 1 is started, it is driven by the electric drive system only, while the hybrid vehicle 1 is driven by the engine drive system only in a relatively high speed range. In addition, when the vehicle is further accelerated from the high-speed range, the electric drive system is additionally used to assist the engine drive system.

Now, operations particular to the hybrid vehicle 1 of this embodiment will be described.

When the hybrid vehicle 1 is running based on the engine drive, if either of the wheels driven by the engine skids to rotate excessively, the skid of that wheel is remedied, and traction which becomes insufficient due to the skid of the wheel is compensated by driving the other wheels by the motors.

Figure 2:
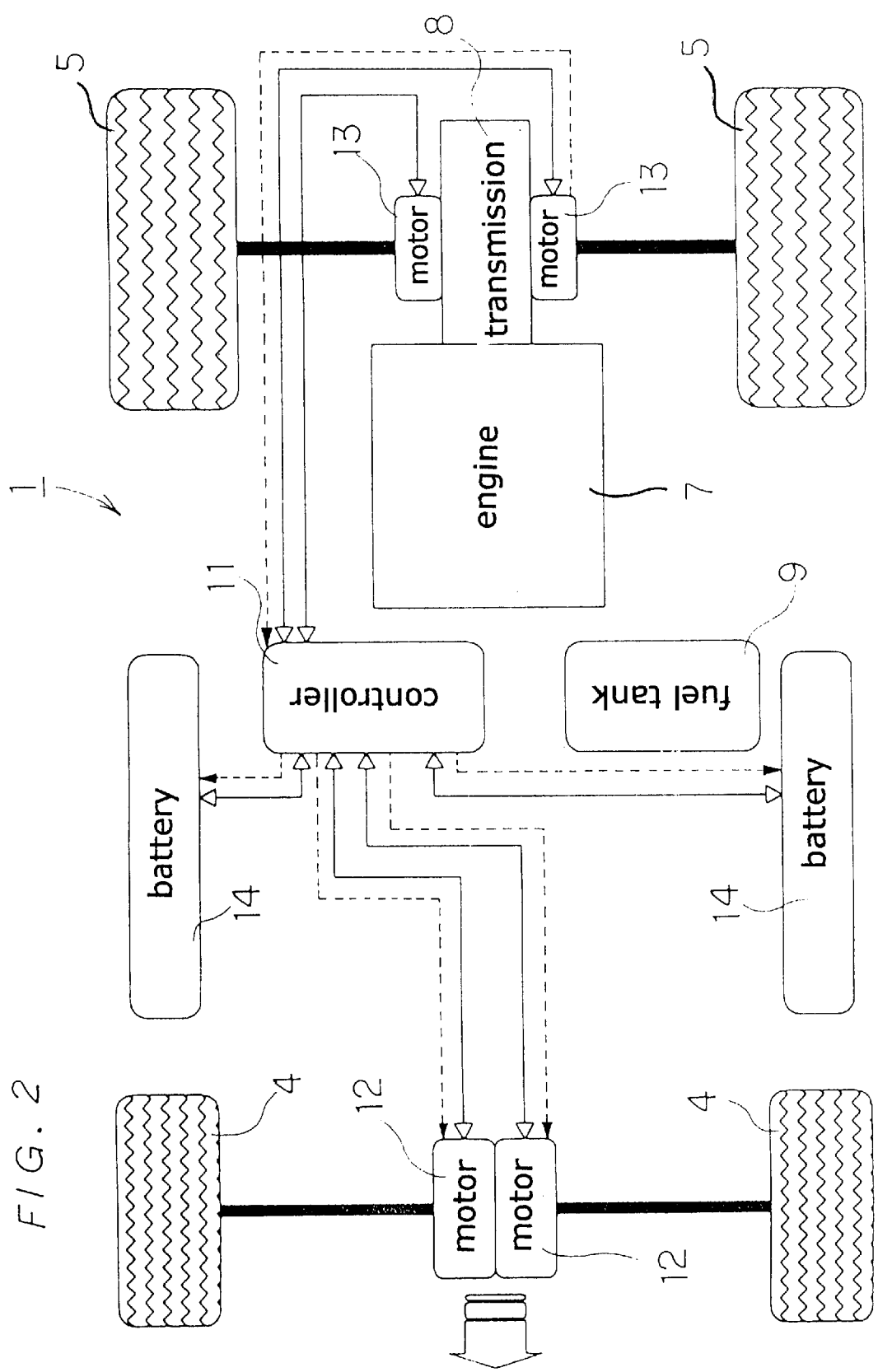
FIG. 2 is a plan view showing a state of control at the occurrence of a skid according to the first embodiment of the first invention.

As shown in FIG. 2, the detection of the skid of the wheel described above has found that, for example, the left rear wheel 5 driven by the engine is caused the skid, or the number of rotations larger than that of the other running wheels was detected, the number of rotations of the left rear wheel 5 is decreased until its skid is remedied.

Specifically, the electric motor 13, which is provided for the left rear wheel 5 and in the free run mode by then, operates in a regenerative mode, so that a rotation speed of the left rear wheel 5 is decreased to a level similar to that of the other running wheel 5, and the rotary kinetic energy of the left rear wheel 5 decreased is also recovered as electric energy.

And, the electric energy thus recovered is used to drive the motors of the other wheels, e.g., the front wheels 4, to compensate the traction lost due to the skid.

Specifically, the recovered electric power is subjected to a step-up processing to increase its voltage and charged into the battery 14, and the electric energy is simultaneously supplied according to the recharged volume from the battery 14 to the motors 12 connected to the front wheels 4.

At this time, the driving force by the motors is controlled depending on the running condition when the skid was caused so to obtain an appropriate running traction and an optimum running balance as the entire vehicle, so that the running performance of the vehicle can be retained even at the occurrence of the skid.

For example, when a general four-wheel vehicle undergoes acceleration which may frequently causes skids, a vertical load balance is shifted backward of the vehicle. Therefore, it is desirable that the vehicle has a drive balance of, for example, 20% for the front and 80% for the rear, namely the traction by the rear wheels is greater than that of the front wheels.

When the vertical load balance is variable depending on a loaded condition of the vehicle, it is also preferable to optimize by appropriately controlling to have a different drive balance in view of the same reason. For example, such cases include that a truck having a large load carrying capacity has occasions from a fully loaded condition to a no load condition and a light vehicle having a light weight has occasions of carrying not only variable loaded cargoes but also variable number of people in it.

In addition, when the vehicle is cornering, in order to avoid over-steering or under-steering, namely to avoid a disadvantage that a turning radius corresponding to steered magnitude by the driver cannot be obtained, a difference in rotation speed of the turning inside and outside wheels is appropriately determined, or the distribution of torque to the respective wheels 4, 5 is appropriately determined.

Therefore, a single or plurality of motors are selected to meet the above conditions and the output of each motor is appropriately controlled, so that the running performance can be maintained even at the occurrence of skids.

The above operation to remedy the skid of any wheel is stopped when it is confirmed by the rotation sensors mounted on all the wheels that the rotation speed of the pertinent wheel has become substantially the same value as the average value of the rotation speeds of all the wheels or the appropriate value calculated from a ground speed detected by the sensors.

Specifically, it is designed that the skid remedying operation is stopped when the rotation speed of the wheel becomes in a range of about 10% of the above average value or optimum value and made again when the rotation speed of the wheel exceeds the above range.

Therefore, when the hybrid vehicle causes a skid due to a road condition such as a bad road surface and then advances to a good road surface to naturally remedy the skid, the aforesaid skid remedying operation and skid compensating operation are automatically stopped to return to the ordinary operation.

It may be controlled to enhance the drive energy, which is higher than the electric energy recovered, by using the electric energy of the battery, so as to give a priority to fully secure the running traction at the occurrence of a skid.

In this embodiment, the structure of driving only the rear wheels by the engine has been described, but the structure of this embodiment can also be applied to a structure of driving only the front wheels by the engine and a structure of driving all the wheels by the engine, and the same effect can be provided.

As described above, according to the hybrid vehicle of this embodiment, while the vehicle is running by the engine and one of the running wheels driven by the engine causes a skid to rotate excessively, the motor connected to the pertinent running wheel is activated for a regenerative operation to decelerate it so to remedy the skid of the running wheel, and the rotary kinetic energy of the running wheel is recovered as the electric energy. Thus, the energy efficiency of the hybrid vehicle can be improved.

Since this operation is an electrical operation of the electric motor, it has a good quick response, and reliable measures can be made, so that the skid can be remedied securely and quickly. Accordingly, when the engine is operated at a relatively high speed, stable running can be made, running performance can be improved, and it is favorable in view of safety.

Furthermore, the motor associated with the other drive wheel is driven by using the recovered electric energy as described above to compensate the traction lost by the skid, so that the running performance is not degraded. In other words, the other running wheel can be driven by the associated motor to avoid unstable running caused by the skid in addition to the simple remedying of the skid.

At this time, the running wheels driven by the motors are selected or output of each motor driving force of the plurality of running wheels is adjusted depending on the vertical load balance due to a loaded condition of the vehicle and the running condition at the occurrence of the skid, to make the redistribution of the running driving force so to enable the prevention of lowering of the running balance.

As a result, the hybrid vehicle having an overall high performance can be obtained because the running stability, cruising range and the like of the vehicle on a bad road are improved.

A second embodiment of the first invention will be described with reference to FIG. 3.

When recharging is required because the remaining amount in the battery is small or the like, the hybrid vehicle of this embodiment can make recharging by using the vehicle engine regardless whether the vehicle is running or in the stopped state.

Figure 3:
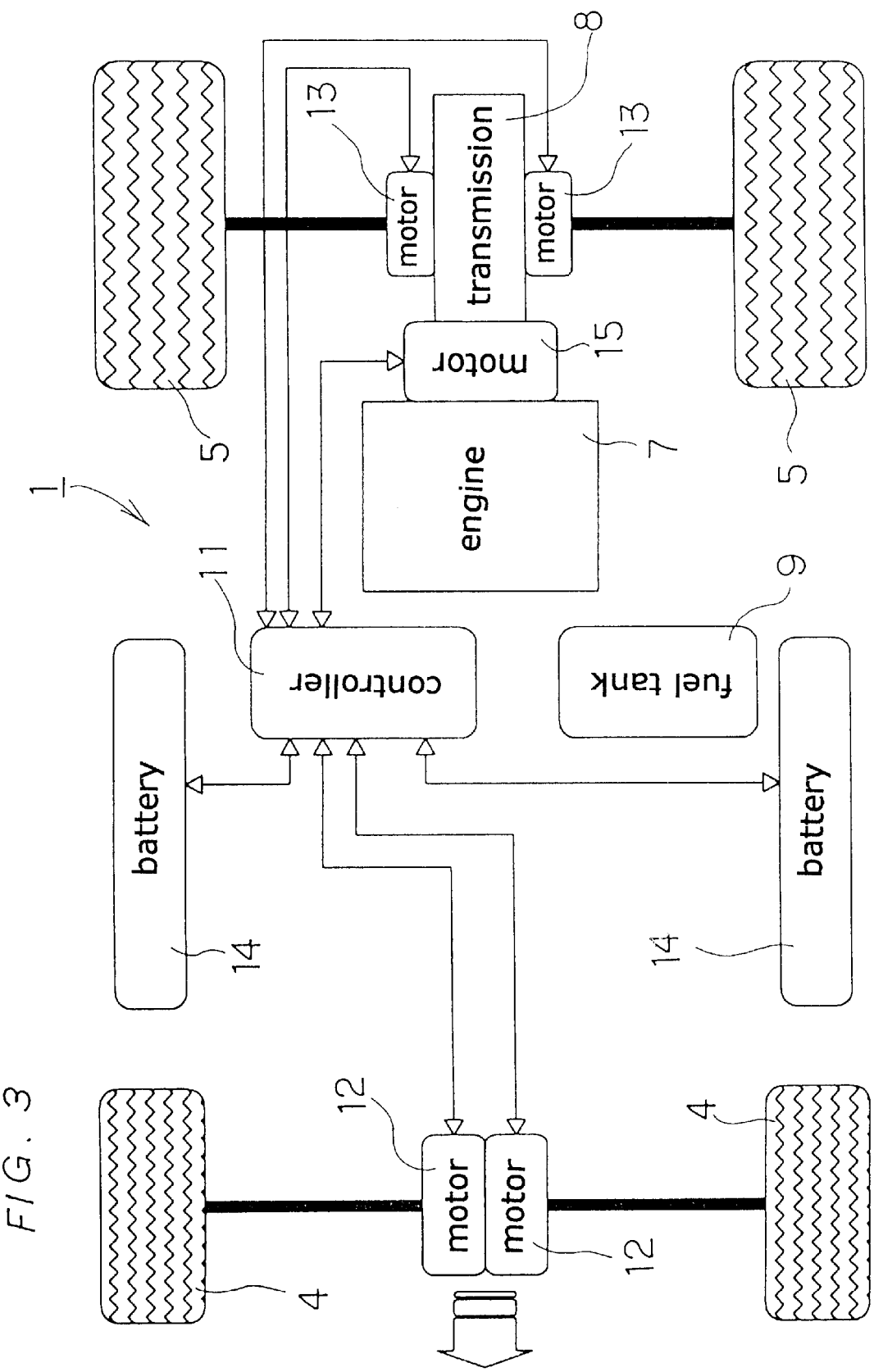
FIG. 3 is a plan view showing a schematic general structure of an electric four-wheel vehicle as an example of the hybrid vehicle according to a second embodiment of the first invention.

Specifically, as shown in FIG. 3, a third motor 15 is additionally provided between the engine 7 and the transmission 8 which are configured in the same way as in the first embodiment.

The third motor 15 also serves as a starter cell motor required for starting the engine 7 so to eliminate the necessity of a separate starter cell motor to simplify the structure and also to make weight reduction and cost reduction.

The third motor 15 also has the same modes as the motors connected to the respective wheels, such as a drive mode for externally outputting a driving force, a free-run mode not to output the driving force and a recharging mode to operate as the electric power generator, and it is normally set to the free-run mode.

The recharging operation may be made either by the driver who selects to do so as desired, or automatically by the controller 11, or by combining both of them.

Therefore, when it is necessary to recharge the battery, it can be recharged any time by the engine regardless of whether the vehicle is running or not.

In other words, when the vehicle is driven by the engine, this additional motor can be used for recharging only, so that the skid remedying operation and the like can be made sufficiently by the motors connected to the respective wheels as described above.

And, when the vehicle is stationary, the connection of the added motor to the drive shafts of the rear wheels can be cut off by declutching the transmission, and only the added motor can be driven by the engine without running the vehicle to generate electric power so to recharge the battery.

Besides, when a vehicle which is driven by the motors only is running at a low speed, recharging by driving the engine is possible, and, in this case, the electric motor system for driving the respective wheels and the engine recharging motor system are also cut off by the clutch from each other, so that they are independent from each other without interfering and each system provides satisfactory operation function.

And, when recharging by the engine as described above, the optimum driving conditions for the engine, the recharging motor and the battery, namely the optimum conditions having the engine's fuel consumption, the motor's power generation rate, the battery recharging rate in combination can be determined for recharging, so that the recharging efficiency can also be improved.

A third embodiment of the first invention will be described with reference to FIG. 4.

The hybrid vehicle of this embodiment is obtained by simplifying the vehicle of the embodiment 2 in order to make cost reduction.

Figure 4:
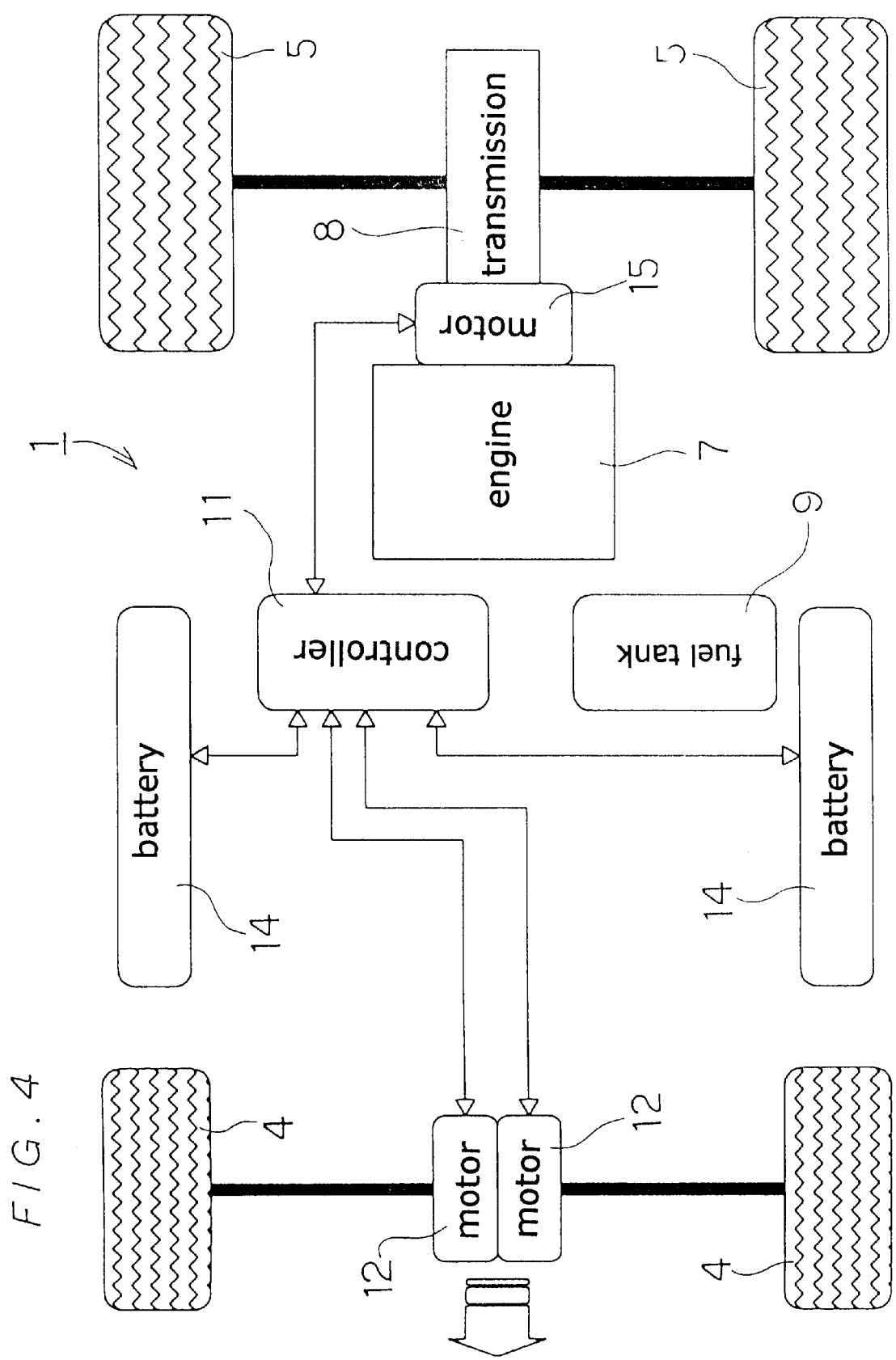
FIG. 4 is a plan view showing a schematic general structure of an electric four-wheel vehicle as an example of the hybrid vehicle according to a third embodiment of the first invention.

In other words, as shown in FIG. 4, it is configured by removing the electric motors 13, 13 connected to the rear wheels 5, 5 from the structure of the above second embodiment.

The third motor 15 of this hybrid vehicle of this embodiment also serves as a starter cell motor required to start the engine 7 in the same way as in the previous embodiment, so that a separate starter cell motor is not required, the structure is simplified, and weight reduction and cost reduction can be made.

And, the third motor 15 has the same modes as the motors 12 connected to the front wheels 4, such as a drive mode for externally outputting a driving force, a free-run mode not to output the driving force and a recharging mode to operate as the electric power generator, and it is normally set to the free-run mode.

The recharging operation may be made either by the driver who selects to do so as desired, or automatically by the controller 11, or by combining both of them.

Therefore, when it is necessary to recharge the battery, it can be recharged any time by the engine regardless of running conditions of the vehicle.

And, when the vehicle is stationary, the connection of this motor to the drive shafts of rear wheels can be cut off by declutching the transmission, and only this motor can be driven by the engine to recharge the battery.

Besides, when a vehicle which is driven by the motors only is running at a low speed, recharging by driving the engine is possible, and, in this case, the electric motor system for driving the respective wheels and the engine/recharging motor system are also cut off by the clutch from each other, so that they are independent from each other without interfering and each system provides satisfactory operation function.

And, when recharging by the engine as described above, the optimum driving conditions for the engine, the recharging motor and the battery, namely the optimum conditions having the engine's fuel consumption, the motor's power generation rate and the battery recharging rate in combination can be determined for recharging, so that the recharging efficiency can also be improved.

Now, an embodiment of a second invention will be described with reference to the drawings.

Figure 5:
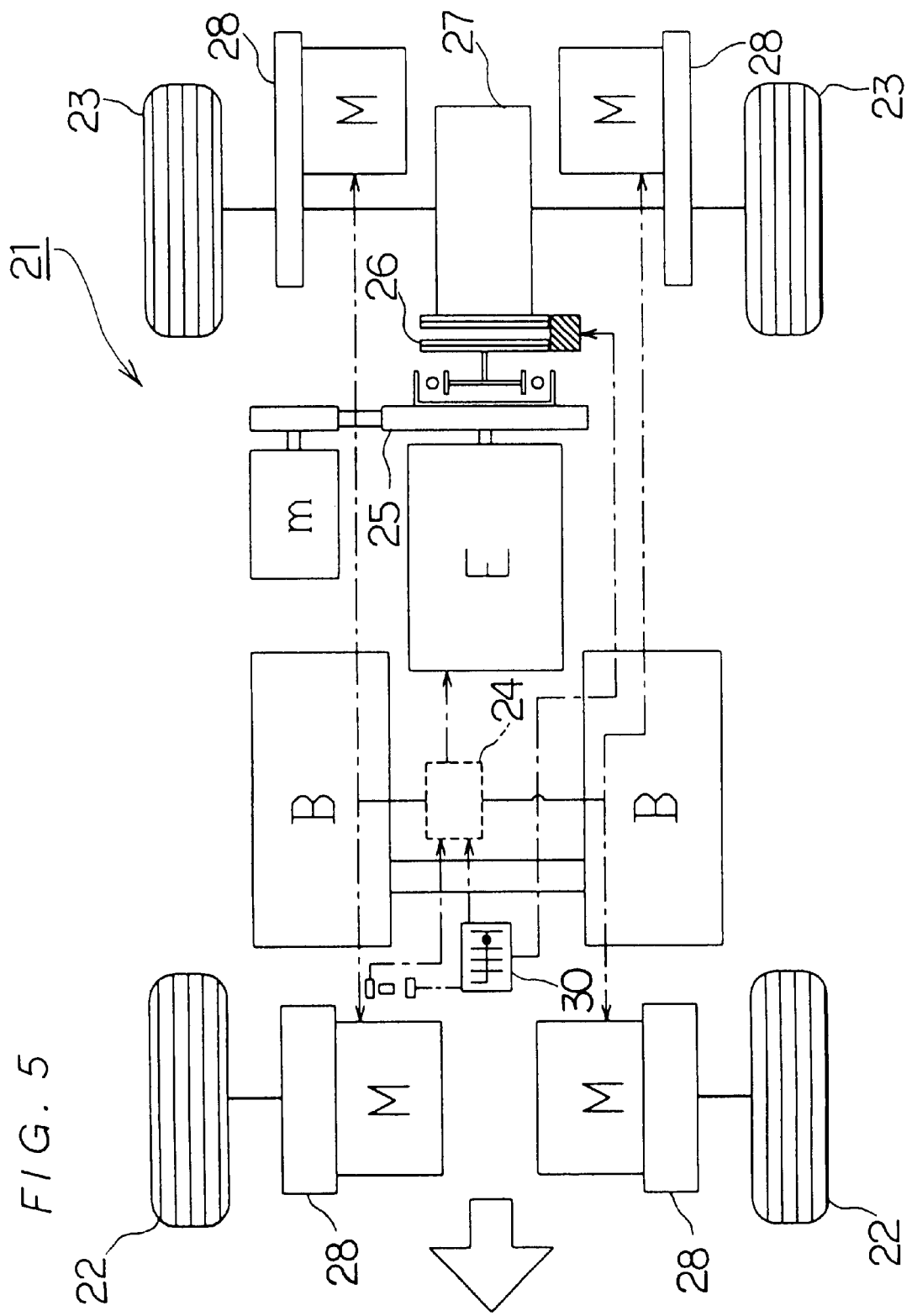
FIG. 5 is a block diagram of a hybrid vehicle according to an embodiment of a second invention.

It is seen in FIG. 5 that a hybrid vehicle 21 of this embodiment has running wheels (front wheels 22 and rear wheels 23), which are suspended at the front and rear of the main frame of an unillustrated vehicle body in the same way as a four-wheel vehicle which is one of general vehicle types. The front wheels 22 are steered by the driver through the steering wheel, and the front and rear wheels 22, 23 or the rear wheels 23 are rotationally driven to run the vehicle. As its drive source, an engine drive system based on a conventional internal combustion engine E and an electrical drive system based on electric motors M, M are mounted, and a hybrid system controller 24 is provided for switching them or operating in cooperation by an operation lever which will be described afterward.

A flywheel 25, a one-way clutch 26 and a transmission 27 are arranged downstream of the engine E, and an electric motor m for starting the engine and recharging is provided in connection with the flywheel 25. Symbol B is a storage battery.

Unillustrated fuel tank, fuel pump and piping for supplying a fuel to the engine E and engine auxiliaries such as an engine cooling device are disposed in the periphery of the engine E in the same way as in the aforesaid embodiment.

The electric motors M for driving the front and rear wheels 22, 23 are arranged to transmit the torque to the wheels 22, 23 via the respective reduction gears 28, 28.

The hybrid vehicle 21 of this embodiment has as its operation modes an engine running mode for outputting a driving force of the engine E according to the stepped-on quantity of the accelerator pedal by the driver, an engine/electric motor-based running mode for outputting the driving forces of both the engine E and the electric motors M, and an electric motor running mode for outputting the driving forces of the electric motors M only.

The engine running mode is a mode that an throttle opening angle is varied according to a stepped-on quantity of the accelerator pedal by the driver to increase the torque of the engine E. The engine/electric motor-based running mode is a mode that the driving forces of the electric motors M are also used together with the driving force of the engine E, and the electric current values of the motors are increased to increase the motor torque according to the stepped-on quantity of the accelerator pedal by the driver. The motor torque value in the engine/electric motor-based running mode can be made small as compared with the electric motor running mode because the electric motors cooperate with the engine to drive the vehicle. The engine running mode and the engine/electric motor-based running mode will be called as an HEV mode hereinafter.

The electric motor running mode is a mode to drive the vehicle by the driving force of the electric motors M only as described above, and the electric current values of the electric motors are increased to increase the motor torque according to the stepped-on quantity of the accelerator pedal by the driver. In this mode, the motor torque values with respect to a throttle opening angle can be made larger as compared with the HEV mode because the vehicle is driven by the motors only. This electric motor running mode will be called as an EV mode hereinafter.

In the HEV mode, the revolutions of the engine E are transmitted to the transmission 27 via the clutch 26, and the rear wheels 23 are driven to rotate by the rotation force converted by the transmission 27. In this embodiment, the gear change operation is made by a manual transmission operation section 30 which will be described afterward.

Figure 6:
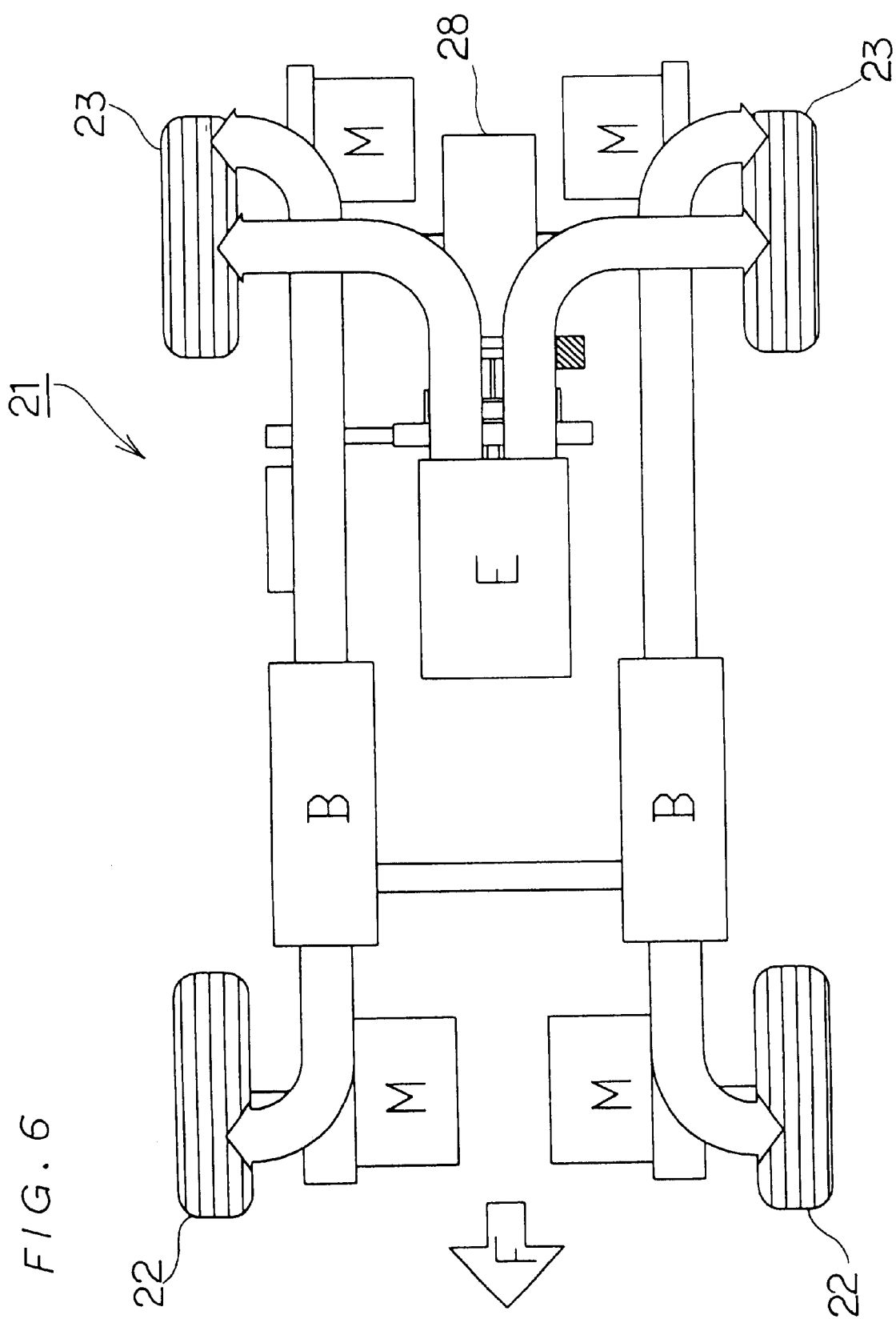
FIG. 6 is a diagram showing a basic operation of driving control in an HEV mode according to the embodiment of the second invention.

In the HEV mode, the throttle opening angle is variable according to the stepped-on quantity of the accelerator pedal by the driver, and when the electric motors Mare used together, the electric current values of the electric motors M are also variable according to the stepped-on quantity of the accelerator pedal by the driver, but the amounts of their changes are calculated by the controller 24 so to produce an appropriate rotation traction. FIG. 6 shows a state that outputs from the engine E and the electric motors M in the HEV mode are supplied to the rear wheels 23 and also to the front wheels 22.

Figure 7:
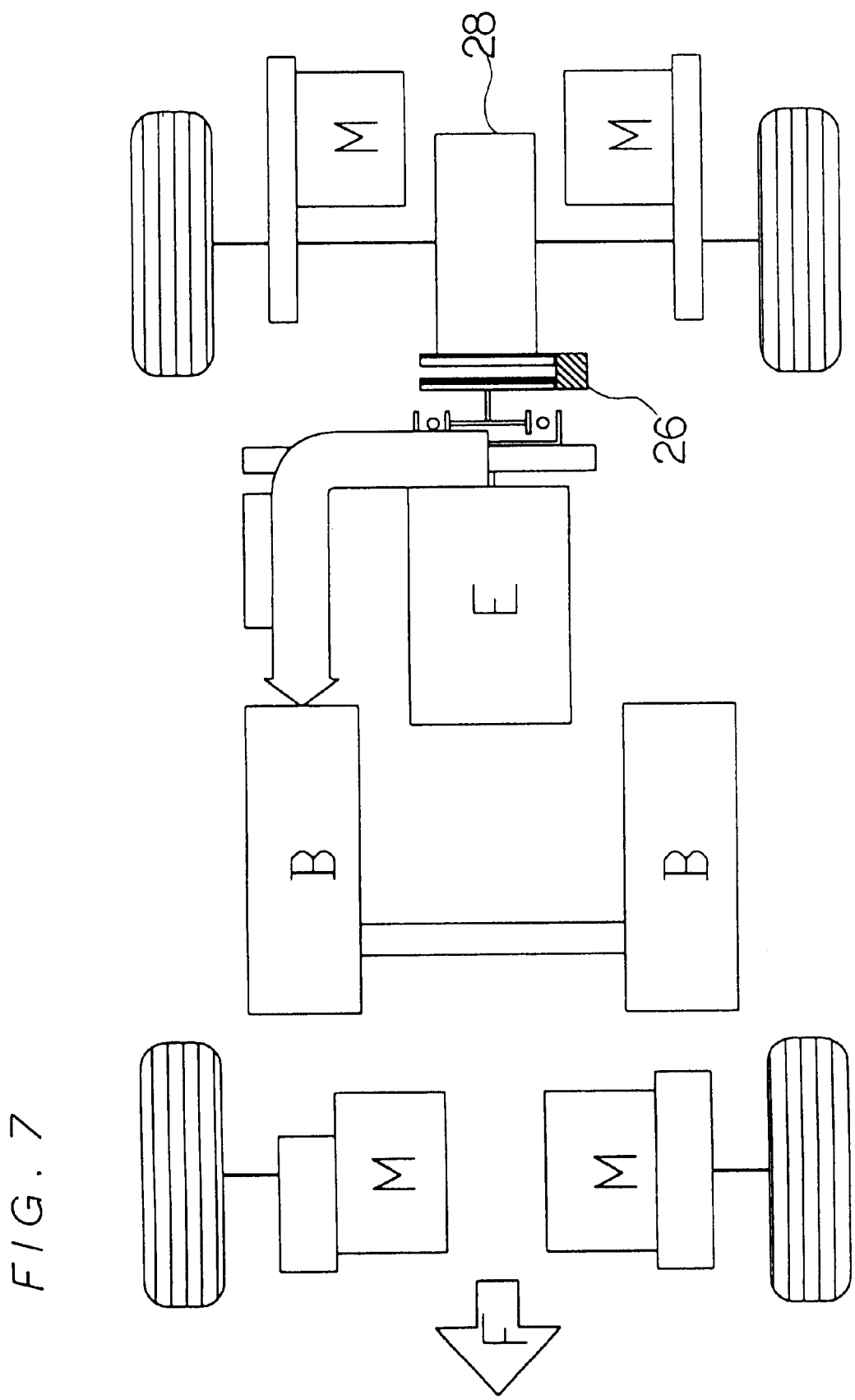
FIG. 7 is a diagram showing a basic operation of driving control in the HEV mode according to the embodiment of the second invention.

In the HEV mode, as shown in FIG. 7, the engine E is driven in a state that the clutch 26 is released to rotate the electric motor m for recharging to generate electric power which can be recharged into the storage batteries B.

Figure 8:
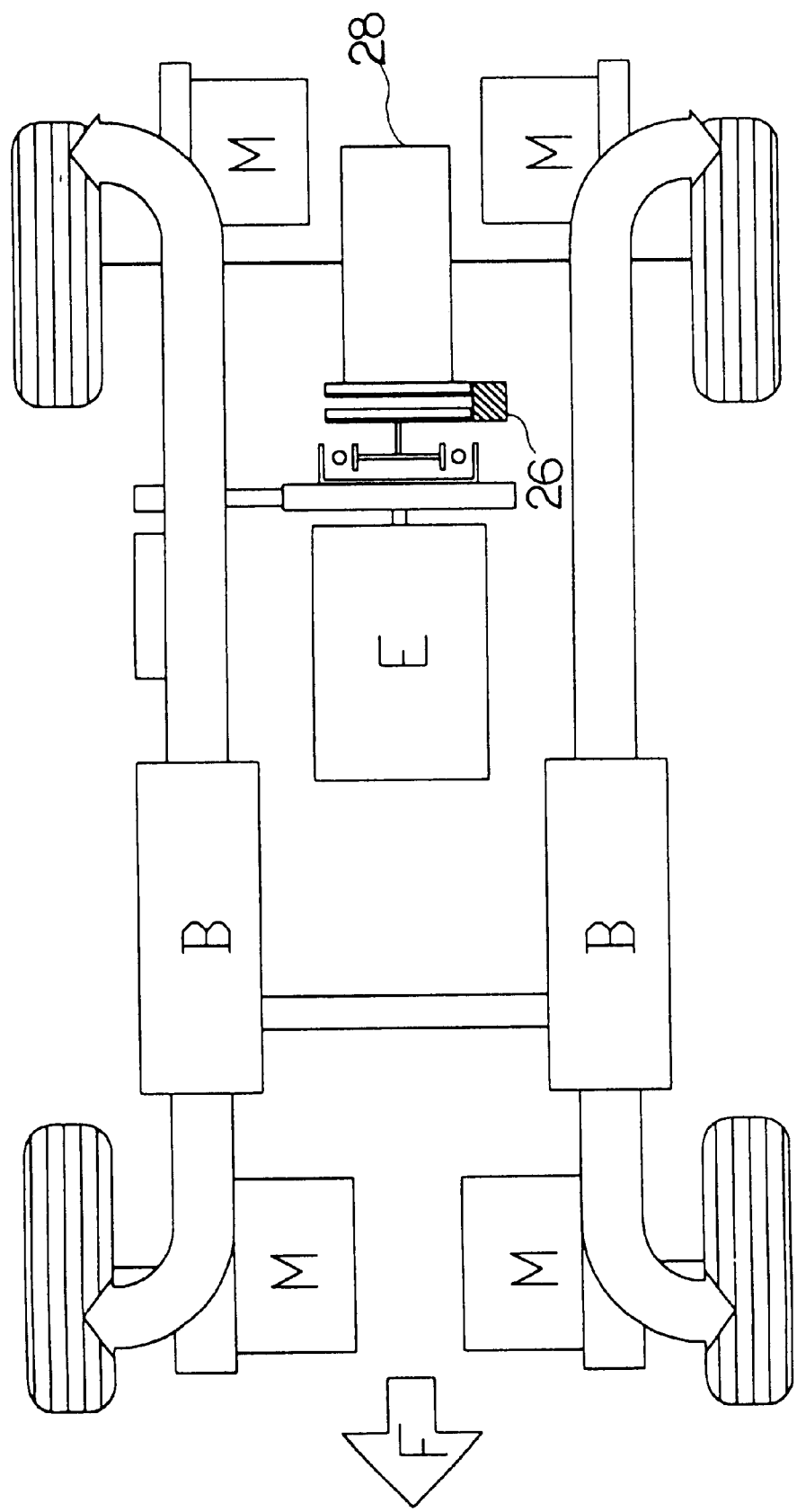
FIG. 8 is a diagram showing a basic operation of driving control in an EV mode according to the embodiment of the second invention.

In the aforesaid EV mode, the electric current values of the electric motors M are variable according to the stepped-on quantity of the accelerator pedal by the driver, and an optimum rotation driving force is output according to the calculation made by the controller 24. FIG. 8 shows a state that the electric power is supplied from the storage batteries B to the electric motors M in the EV mode, and outputs from the electric motors M, M are supplied to the front and rear wheels 22, 23.

Figure 9:
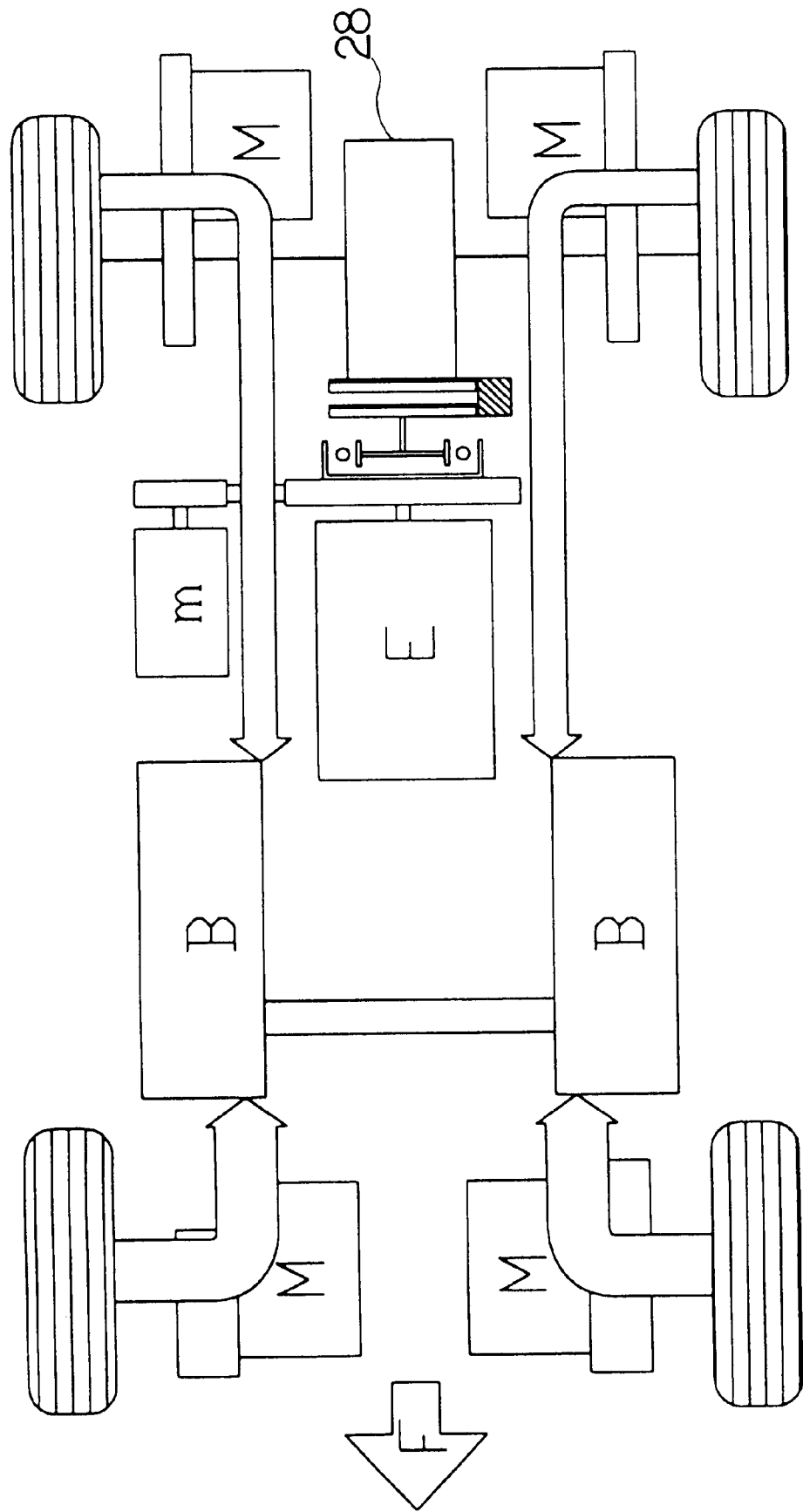
FIG. 9 is a diagram showing a basic operation of regenerative control in the HEV mode and the EV mode according to the embodiment of the second invention.

In both the HEV mode and the EV mode, when the vehicle is decelerating or running a downward slope for example, the rotations of the front and rear wheels 22, 23 are converted from the kinetic energy into the electric energy by using the electric motors M, Mas the electric power generators, and the electricity generated by the electric motors M, M can be charged into the batteries B as shown in FIG. 9. By using the regeneration of electric power, excessive energy can be recovered, so that the energy efficiency of the vehicle is improved.

Figure 10:
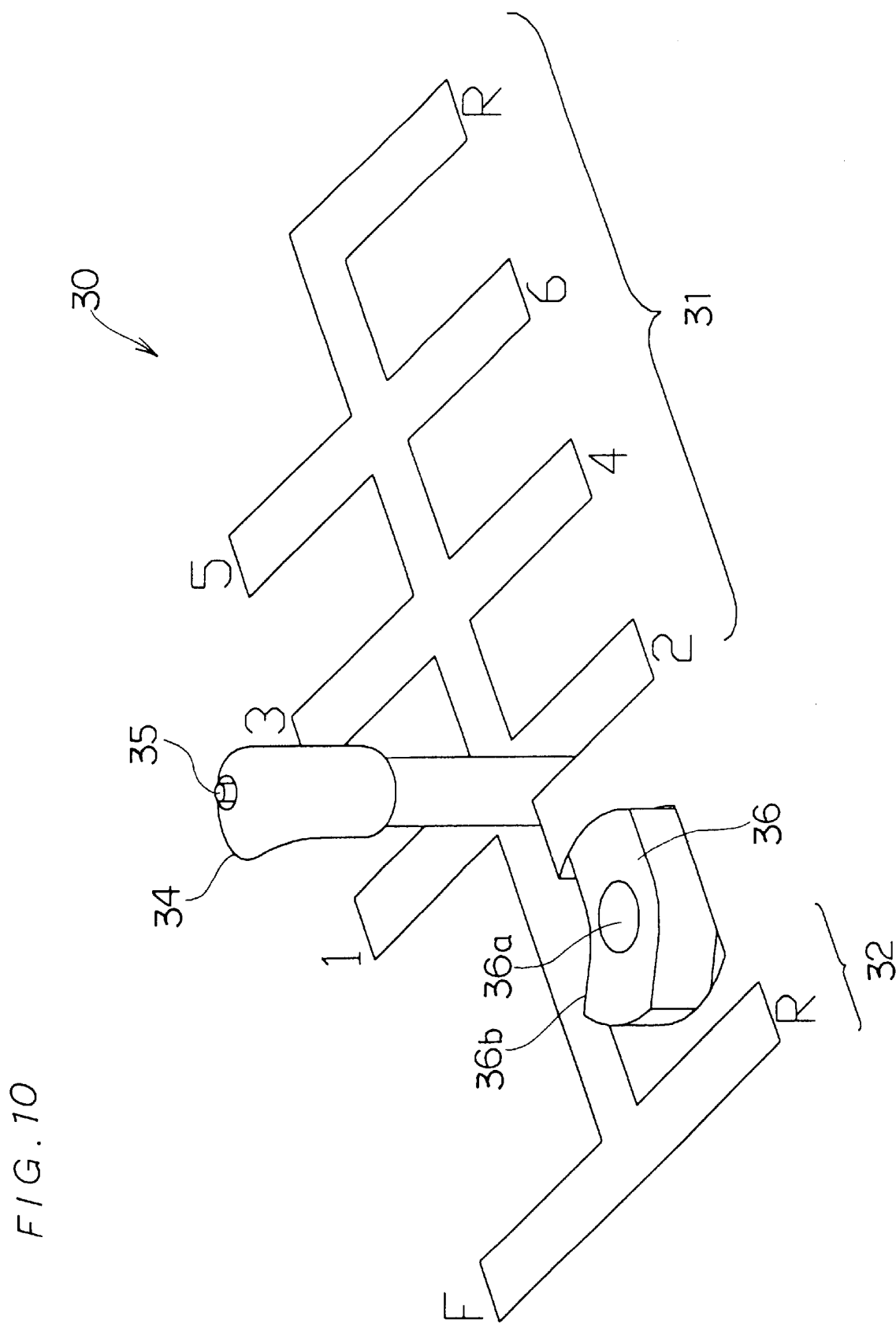
FIG. 10 is a diagram showing a transmission according to the embodiment of the second invention.
Figure 12:
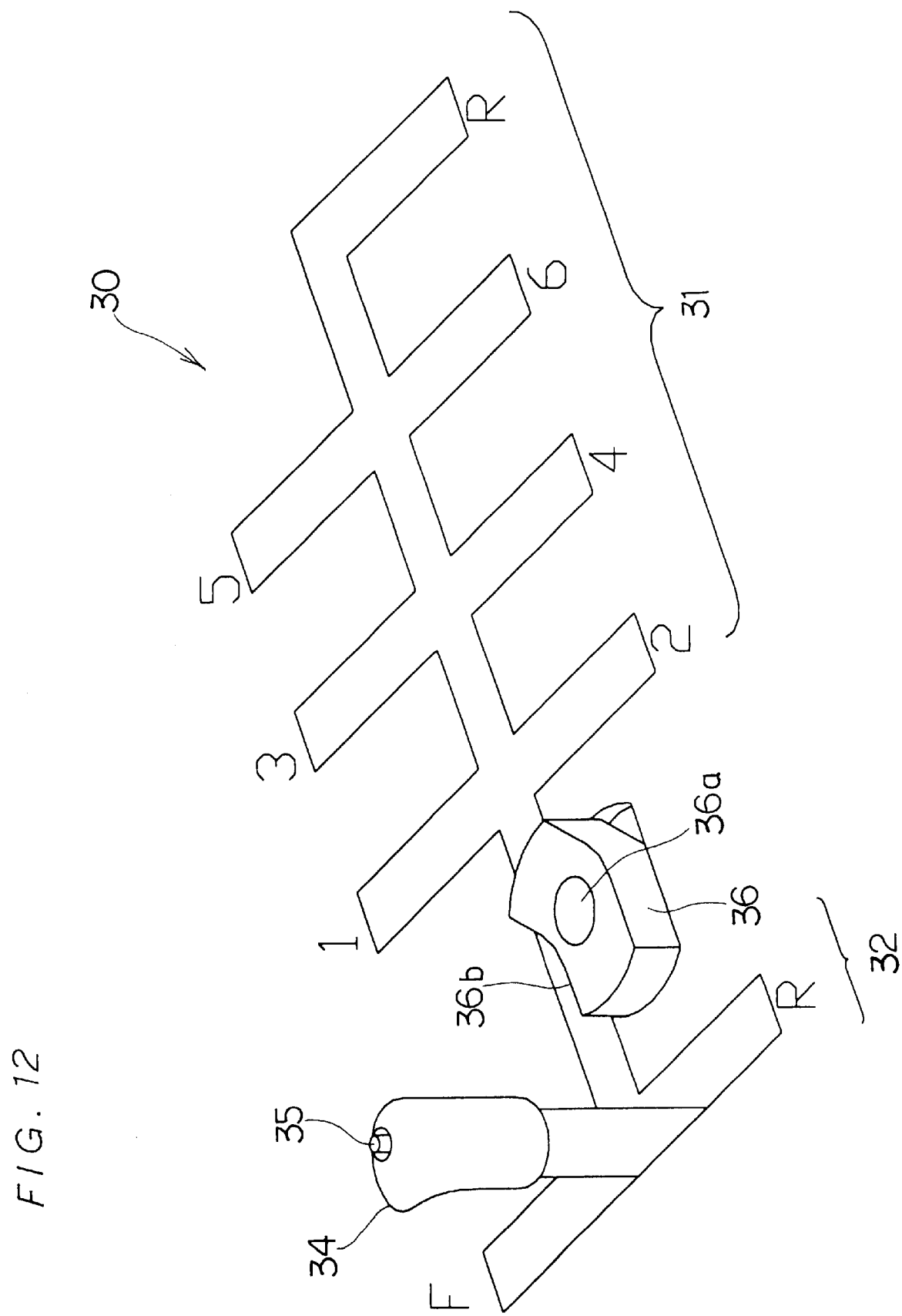
FIG. 12 is a diagram showing the transmission according to the embodiment of the second invention.

In the hybrid vehicle 21 of the above embodiment, the transmission operation section 30 has at least a first operation section 31 for the HEV mode that the engine running system's gears are shifted and a second operation section 32 for the EV mode that the electric motor running system is switched between forward and reverse gears, as shown in FIG. 10 and FIG. 12.

Figure 11:
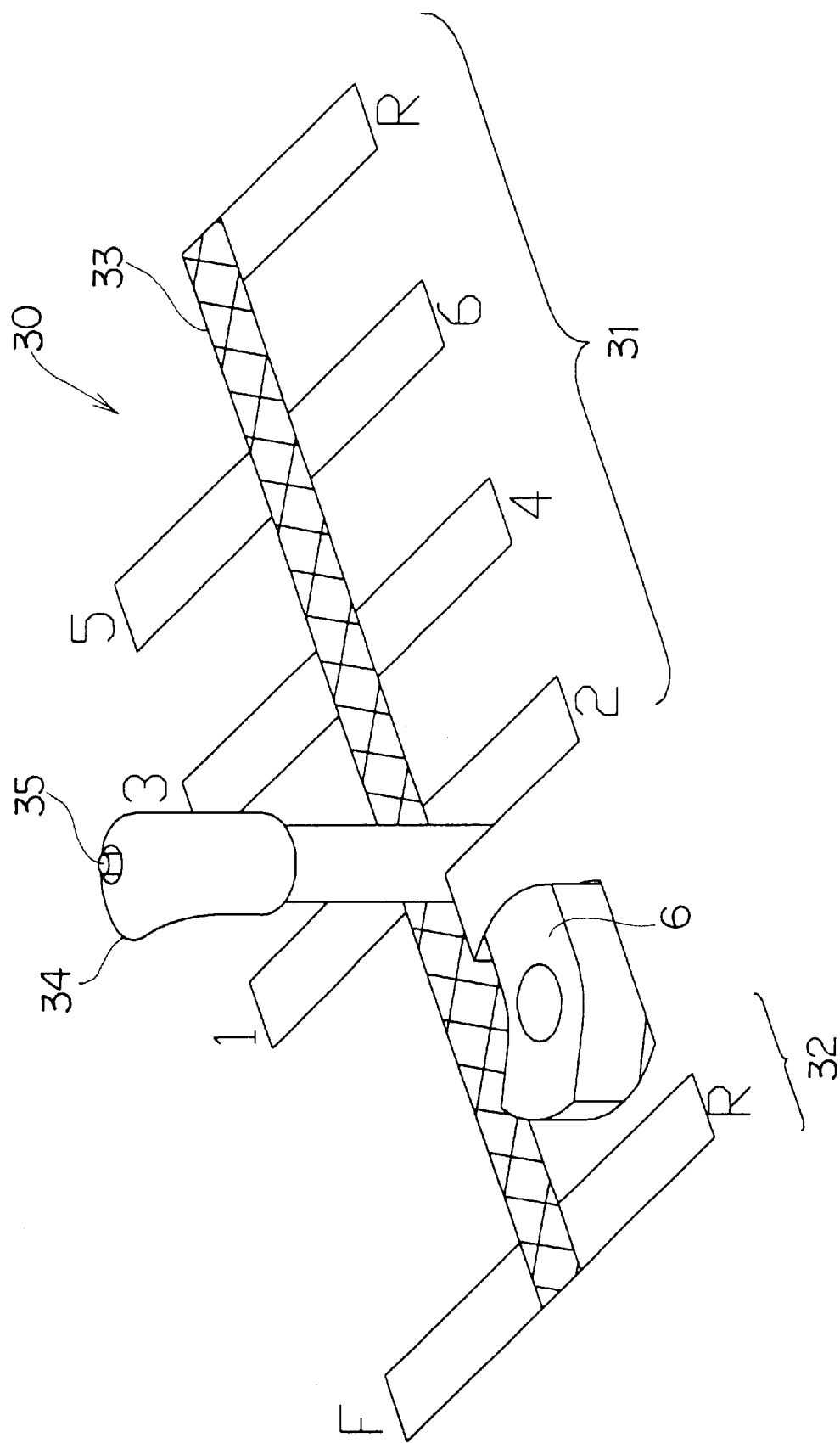
FIG. 11 is a diagram showing the transmission according to the embodiment of the second invention.
Figure 13:
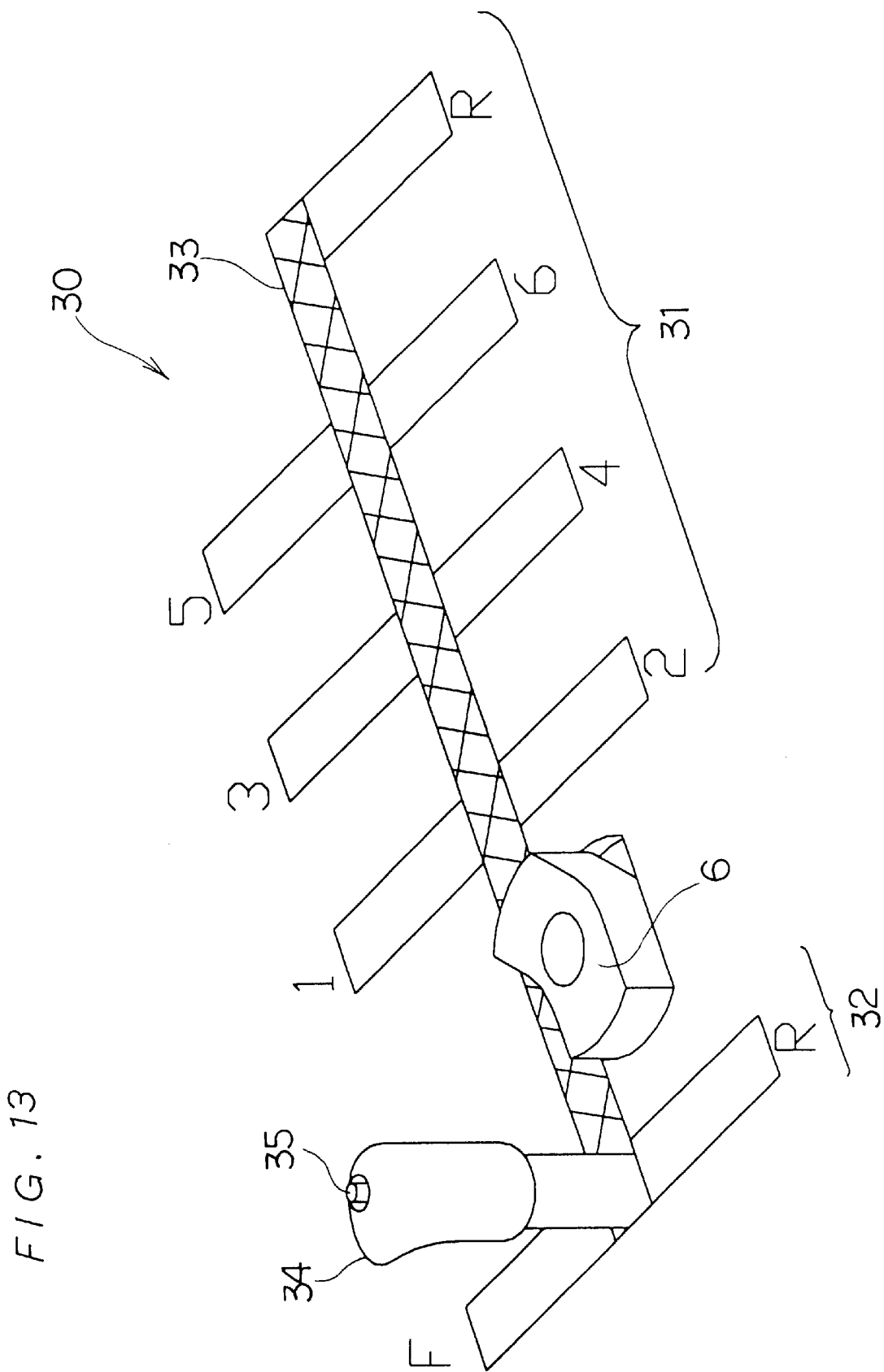
FIG. 13 is a diagram showing the transmission according to the embodiment of the second invention.

The operation sections 31, 32 are provided with a common neutral lever position. In FIG. 11 and FIG. 13, the shaded area indicates a neutral lever position 33. Numerals 1 to 6 in the drawings indicate gear shift modes, and "F" and "R" indicate forward and backward respectively.

The transmission operation section 30 has an operation lever 34 which is movable into and out of both the operation sections 31, 32 as shown in FIG. 10 to FIG. 13. The operation lever 34 is operated to alternatively switch between the engine running system (HEV mode) and the electric motor running system (EV mode).

FIG. 10 and FIG. 11 show that the operation lever 34 is positioned in the HEV mode, and FIG. 12 and FIG. 13 show that the operation lever 34 is positioned in the EV mode. The operation lever 34 is shifted from one mode to the other through the neutral lever position 33 commonly provided for both the modes.

Thus, the operation lever 34 is operated to alternatively switch between the engine running system (HEV mode) and the electric motor running system (EV mode). Therefore, an erroneous operation, that when one of the engine running system and the electric motor running system is being operated, the other is also operated, can be avoided.

As shown in FIG. 10 to FIG. 13, a seesaw switch 36, which is changed-over when the operation lever 34 passes by it, is arranged between the neutral lever position 33 for the engine running system and the neutral lever position 33 for the electric motor running system in the aforesaid common neutral lever position 33.

The seesaw switch 36 of this embodiment has a switching mechanism (not shown) on a lower portion of a rotation shaft 36a, and a contact face section 36b, which has a curved surface to come into contact with the operation lever 34 when it passes by it so to pivot the seesaw switch 36, is formed to face the passage of the neutral lever position. And, when the seesaw switch 36 is pivoted, the switching mechanism sends a switching signal to the controller 24, and switching between the HEV mode and the EV mode is made.

As described above, the seesaw switch 36 is not switched without the operation lever 34 passing by it, so that the alternative switching between the HEV mode and the EV mode can be effected more securely.

And, the operation lever 34 of this embodiment is provided with a switch 35 for starting the engine.

When the alternative switching between the HEV mode and the EV mode is made by the single operation lever 34 as in this embodiment and the operation lever 34 is provided with the switch 35 for starting the engine, switching to the HEV mode (engine running system) can be made in conjunction with the engine starting operation, so that the operation is simple and rational without waste.

In this embodiment, the manual transmission operation section 30 is operated to change gears, and the clutch 26 is provided therefor as described above. When the operation lever 34 is shifted from the first operation section 31 to the second operation section 32 to switch the seesaw switch 36, the engine E is stopped, the clutch 26 is fixed in an open state by a fixing mechanism (not shown). And, when the operation lever 34 is shifted from the second operation section 32 to the first operation section 31 to switch the seesaw switch 36, the clutch 26 fixed in the open state is released. Such switching is basically effected by the controller 24.

The manual transmission with the clutch 26 provided requires to keep the clutch 26 in the open state to change from the HEV mode (engine running system) to the EV mode (electric motor running system) It is convenient that the driver is not required to operate to have the clutch in the open state because the engine E is stopped and the clutch 26 is fixed in the open state when the seesaw switch 36 is switched as in this embodiment. And, to change from the EV mode to the HEV mode, the seesaw switch 36 is switched by the reverse operation to release the clutch 26 which is fixed in the open state. Therefore, it is also convenient because the driver does not need to operate in order to release the clutch 26 from its fixed state.

Besides, if the engine E is not operating when the operation lever 34 is shifted from the second operation section 32 to the first operation section 31, the seesaw switch 36 is in the fixed state, so that the operation lever 34 cannot be shifted to the first operation section 31. Such electrical control is effected by the controller 24.

Thus, when the operation lever 34 is shifted from the second operation section 32 into the first operation section 31, namely the electric motor running system is shifted to the engine running system, the seesaw switch 36 is in the fixed state and the operation lever 34 cannot be shifted into the first operation section 31 if the engine E is not operating. Therefore, the shift of the operation lever 34 to the first operation section 31 provided that the engine E is operating can be prevented if the engine E is not operating, and safety can be secured.

Now, the hybrid vehicle 21 of this embodiment will be described about its manipulation and involved operation to shift from the HEV mode (engine running system) to the EV mode (electric motor running system) and from the EV mode to the HEV mode.

First, when the operation lever 34 is positioned in the first operation section 31 (FIG. 10 and FIG. 11), to start the engine by an unillustrated key (HEV mode), the driver of the hybrid vehicle 21 operates the accelerator to open the engine throttle to drive the engine. The electric motors are also driven in the engine/electric motor-based running mode described above.

In the HEV mode, the clutch 26 is opened or closed through the clutch pedal, the gear change operation is made by the operation lever 34, to select forward drive and its gear ratio and to select between forward and reverse drives. Thus, the operation is the same as the ordinary engine vehicle. And, the driving force from the engine E drives the rear wheels 23 through the transmission 27. As described above, the throttle opening angle is variable according to the stepped-on quantity of the accelerator pedal by the driver to increase the torque of the engine E. The engine/electric motor-based running mode uses the driving forces of the electric motors M in addition to the driving force of the engine E and increases the electric current values of the electric motors according to the stepped-on quantity of the accelerator pedal by the driver to increase the motor torque.

In city driving at a low speed or the like, when the HEV mode is stopped and the EV mode (electric motor running system) is used to drive, the operation lever 34 is positioned in the neutral position as shown in FIG. 10 and FIG. 11 and shifted into the second operation section 32 as shown in FIG. 12 and FIG. 13.

When the operation lever 34 passes by the seesaw switch 36, the operation lever 34 is contacted with the contact face 36b of the seesaw switch 36 to pivot it. The pivoting of the seesaw switch 36 causes the switching mechanism to transmit a switching signal to the controller 24 so to switch from the HEV mode to the EV mode. And, the engine E is also stopped, and the clutch 26 is fixed in the open state by an unillustrated fixing mechanism. The clutch pedal may be designed so to be retracted.

In the EV mode, the electric current values of the electric motors M are variable according to the stepped-on quantity of the accelerator pedal by the driver as described above, and an appropriate rotation driving force is output according to calculation made by the controller 24.

When the EV mode is changed to the HEV mode as the vehicle goes from a city area to a suburb or runs a driveway, the operation is made in reverse order of the aforesaid operation. Specifically, the operation lever 34 is located in the neutral position as shown in FIG. 12 and FIG. 13 and then shifted to the first operation section 31 as shown in FIG. 10 and FIG. 11.

At this time, if the engine E is not operating, the seesaw switch 36 is in a fixed state, so that the operation lever 34 cannot be shifted into the first operation section 31. Therefore, the engine starting switch 35 formed on the operation lever 34 is depressed to start the engine before shifting the operation lever 34 into the first operation section 31. When the engine is started, the seesaw switch 36 is released from its fixed state.

When the seesaw switch 36 is released from its fixed state and the operation lever 34 is shifted into the first operation section 31, the operation lever 34 comes in contact with the contact face 36b of the seesaw switch 36 while it passes by the seesaw switch 36 to pivot it. When the seesaw switch 36 is pivoted, the switching mechanism sends a switching signal to the controller 24, and the EV mode is changed to the HEV mode accordingly.

When the seesaw switch 36 is switched, the clutch 26 is released from its fixed open state and resumes its normal operation, and the drive by the HEV mode (engine running system) is performed after that.

This embodiment which has the clutch in the engine running system is configured to turn off the electric motors when the clutch is entered the open state.

Specifically, in the gear change operation in the first operation section to change gears of the engine running system with the manual transmission having the clutch provided, if the vehicle is accelerated by the driving forces of the electric motors when the driver steps on the clutch pedal and also the accelerator pedal, operability is different from the ordinary vehicles, and a danger may be caused.

Therefore, even when the driver steps on the clutch pedal and also the accelerator pedal, the electric motors are turned off so to have the operability of the ordinary vehicle.

Figure 14:
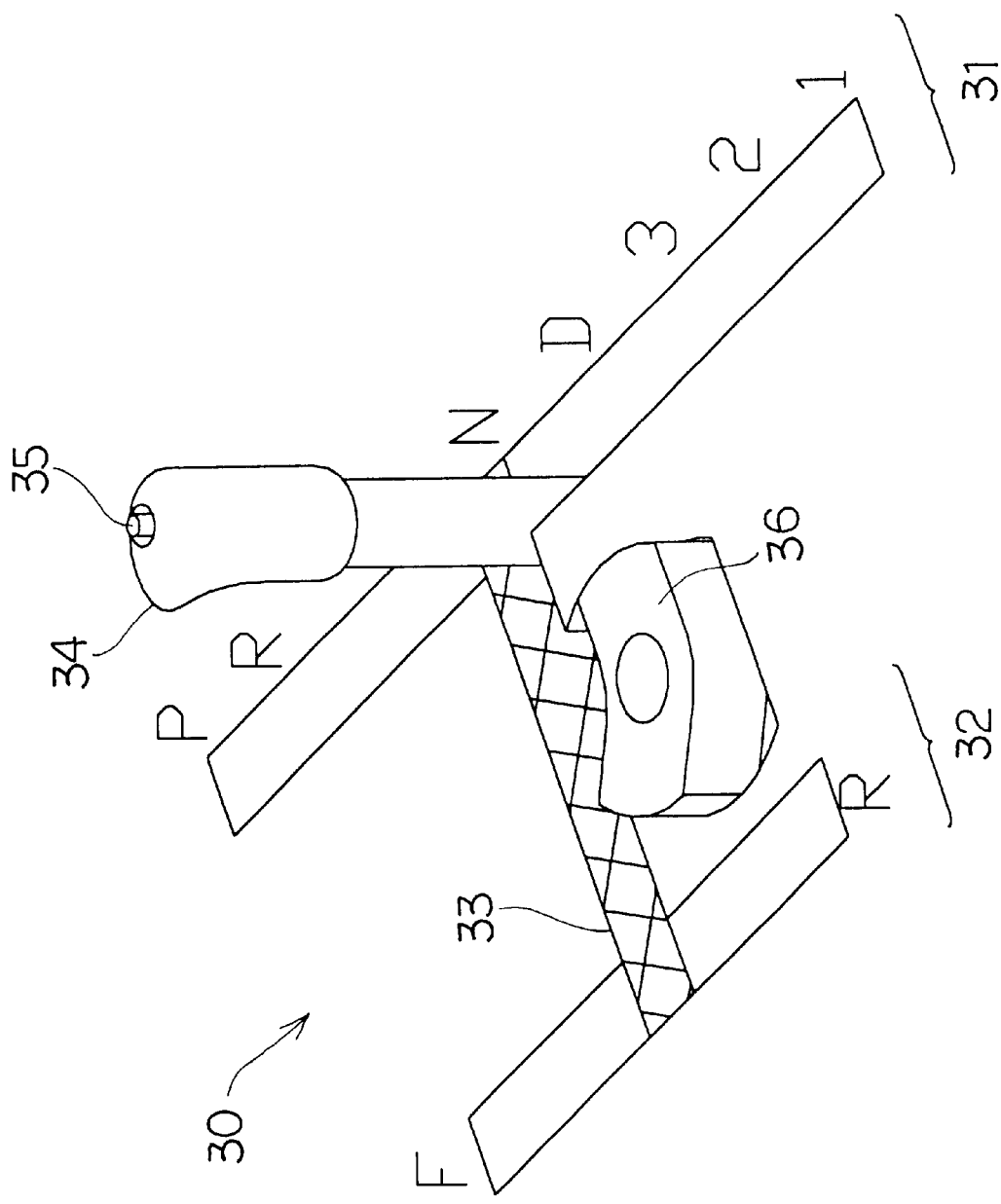
FIG. 14 is a diagram showing a transmission according to another embodiment of the second invention.

The above embodiment has been described with reference to the manual gear change operation in the HEV mode. But, it is also applied to a semi-automatic gear change or automatic gear change in the HEV mode as shown in FIG. 14 for example. In FIG. 14, a semi-automatic transmission or full automatic transmission is provided for the engine running system, and it is configured that the electric motors operate according to the operation of the accelerator pedal even when the clutch is in the open state.

The semi-automatic transmission does not have a clutch pedal to be operated by the driver. When the driver operates the operation lever, the clutch is automatically engaged or disengaged. And, the automatic transmission does not have a clutch pedal to be operated by the driver, and the gear change operation is automatically effected according to the operation of the gas pedal by the driver and the speed. In those cases, while the clutch operation and the gear change operation are automatically effected, the electric motors can be operated through the accelerator pedal. And, the driving forces of the electric motors can be applied to the vehicle while the gear change is being made. Therefore, driving according to the stepped-on quantity of the accelerator pedal can be maintained.

According to the hybrid vehicle of this embodiment described above, the engine running system and the electric motor running system are alternatively switched, so that an erroneous operation can be avoided, and safety can be improved further.

Now, a first embodiment of a third invention will be described with reference to FIG. 15 and FIG. 16.

Figure 15:
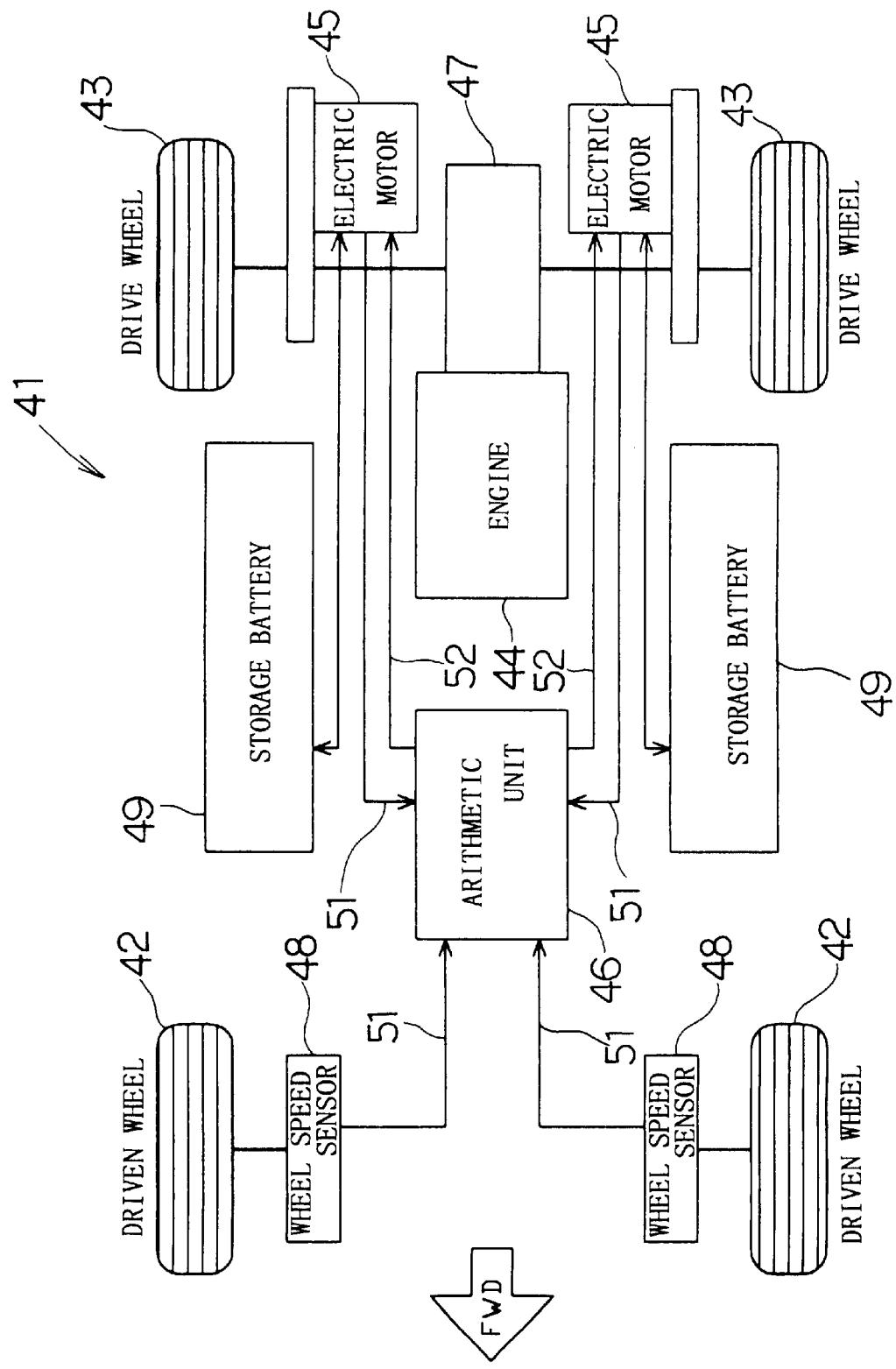
FIG. 15 is a block diagram of a hybrid vehicle according to a first embodiment of a third invention.

In FIG. 15, a hybrid vehicle 41 of this embodiment has running wheels (driven wheels 42 and drive wheels 43), which are suspended at the front and rear of the main frame of an unillustrated vehicle body in the same way as in the previous embodiment. The driven wheels 42 are steered by the driver through the steering wheel, and the drive wheels 43 are rotationally driven to run the vehicle. As its drive source, an engine drive system based on a conventional internal combustion engine 44 and an electrical drive system based on electric motors 45, 45 are mounted, and an arithmetic unit 46 mounted on a hybrid system controller which switches them or operates in cooperation makes calculation of the vehicle speed and controls spin which will be described afterward.

A transmission 47 is arranged downstream of the engine 44, and wheel speed sensors 48, 48 are provided on the driven wheels 42, 42. A yaw sensor (not shown) for detecting a lateral acceleration (yaw rate) of the vehicle is arranged at appropriate positions of the vehicle. Reference numeral 49 is a storage battery.

And, the hybrid vehicle 41 of this embodiment is designed that the rotation conditions of the respective wheels are monitored while the vehicle is running, and if the drive wheels rotate excessively to cause the tires to slip (skid), the number of rotations of the pertinent wheels are decreased to remedy the skid, and the rotation driving energy to be decreased may be recovered by regenerative generation as required.

Namely, this engine drive system includes the internal combustion engine 44 which is mounted at the rear position of the vehicle body main frame, the transmission 47 which is connected to the output shaft of the engine 44 through an unillustrated clutch, and the drive wheels 43 and the drive wheel shafts connected to a gear change output shaft of the transmission 47. Unillustrated fuel tank for supplying a fuel to the engine 44 and engine auxiliaries such as a fuel pump, piping, engine cooling device are arranged in the periphery of the engine 44 in the same way as in the aforesaid embodiment.

The electric drive system includes the electric motors 45, 45 respectively provided for the drive wheels 43, 43 and the storage batteries 49 for supplying electric energy to the respective electric motors 45, 45. Flow of the electric energy is controlled by the arithmetic unit 46 of the controller.

Besides, the electric motors 45, 45 have as their operation modes a drive mode (powering) for externally outputting a driving force according to the stepped-on quantity of the accelerator pedal by the driver, a drive limit mode for limiting the driving force, and a regenerative mode for operating as an electric power generator by absorbing an external driving force.

Specifically, the drive mode is an output operation of a general electric motor and controlled according to the stepped-on quantity of the accelerator pedal by the driver to externally output rotation torque corresponding to the supplied drive power. At this time, output of the engine 44 according to the stepped-on quantity (i.e., accelerator opening angle) of the accelerator pedal by the driver and output of the electric motors 45, 45 are transmitted to the drive wheels 43.

In the drive limit mode, the driving electric power supplied to the electric motors 45, 45 according to the stepped-on quantity of the accelerator pedal by the driver is limited according to a magnitude of spin (skid). Thus, torque smaller than that in the drive mode according to the magnitude of skid is transmitted to the drive wheels.

The regenerative mode is the same electric power generating operation as effected by a general generator. It converts the kinetic energy into the electric energy and outputs electric power according to the external driving force. Specifically, in the regenerative mode, generated energy from the electric motors 45, 45 can be controlled to adjust the traction absorbed from outside, namely the drive wheels 43 to which the electric motors are connected, and the rotation speeds of the drive wheels 43 can be lowered as desired.

The wheel speed sensors 48 are respectively and exclusively provided for the driven wheels 42, 42 to detect the number of rotations of the respective driven wheels so to presume a body speed of the hybrid vehicle. Meanwhile, the number of rotations of the electric motors 45 is transmitted to the arithmetic unit 46 to determine the wheel speeds of the drive wheels 43. And, the arithmetic unit 46 compares a predicted body speed with the wheel speeds of the drive wheels 43, and when the difference exceeds respective thresholds which will be described afterward, it is judged that the drive wheels 43 are spinning, and it is controlled to remedy the spins.

Figure 16:
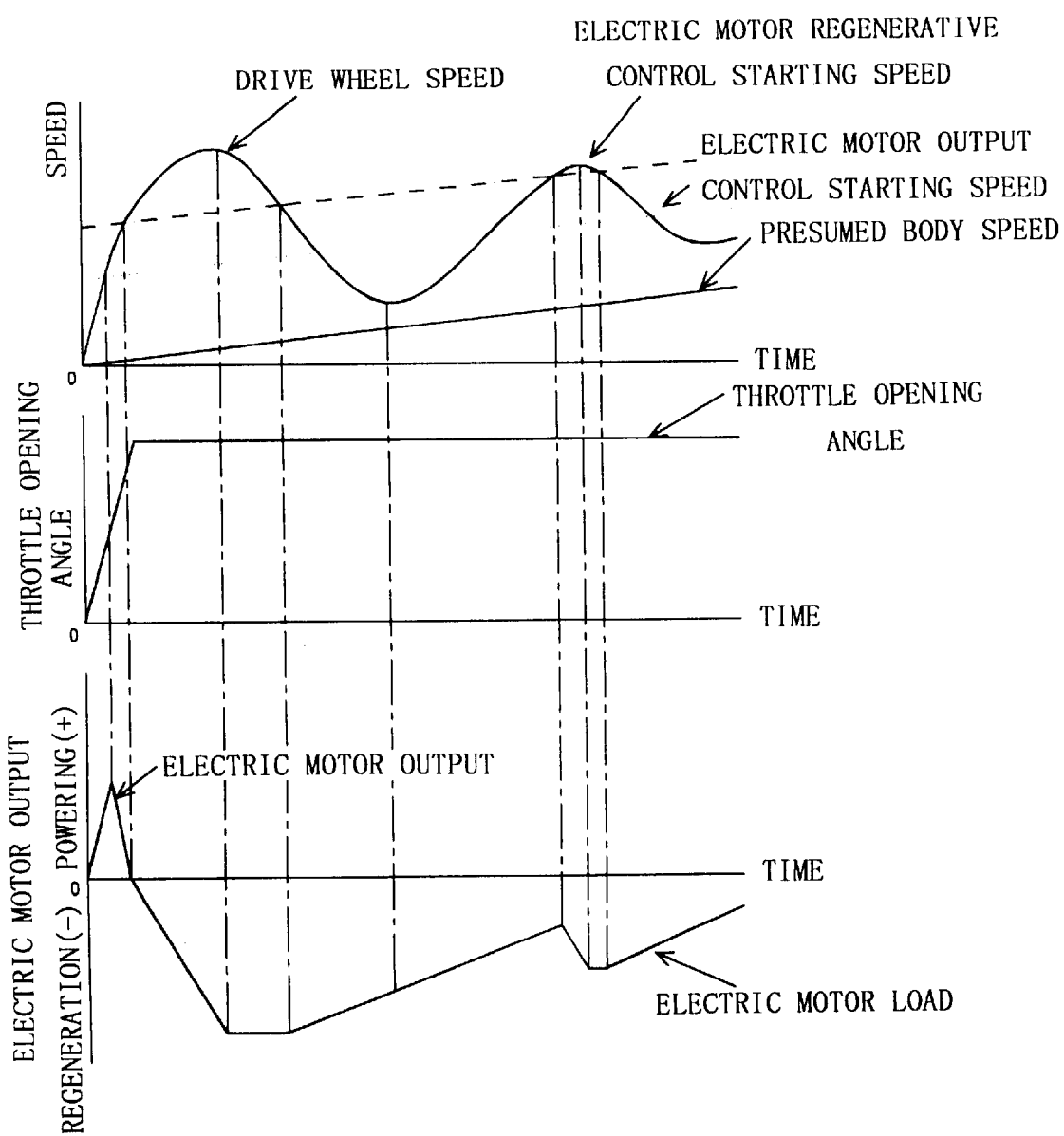
FIG. 16 is a diagram showing a basic operation principle of running control according to the first embodiment of the third invention.

In other words, as the thresholds, an electric motor output control starting speed having a value exceeding the predicted body speed and an electric motor regenerative control starting speed having a value exceeding the electric motor output control starting speed are determined as shown in FIG. 16. And, the arithmetic unit 46 compares the predicted body speed with the wheel speeds of the drive wheels 43, and when it exceeds the electric motor output control starting speed and the electric motor regenerative control starting speed, it is judged that the drive wheels 43 are spinning, and controls are made separately to remedy the spin.

In FIG. 15, lines 51 from the wheel speed sensors 48 to the arithmetic unit 46 and from the electric motors 45 to the arithmetic unit 46 indicate a speed signal, lines 52 from the arithmetic unit 46 to the electric motors 45 indicate a torque command, and lines 53 between the electric motors 45 and the storage batteries 49 indicate a flow of energy.

Now, particular operations of the hybrid vehicle 41 of this embodiment will be described.

When the driver of the hybrid vehicle 41 operates the accelerator pedal, the engine throttle opens to drive the engine and the electric motor output also becomes the drive mode (powering).

When the throttle opening angle becomes large and the vehicle body speed becomes high, the arithmetic unit 46 compares the predicted body speed with the wheel speed of the drive wheel 43. As a result, when it is judged that the wheel speed exceeds the electric motor output control starting speed, the electric motor output is limited (drive limit mode).

Furthermore, when a level of spin becomes high and it is judged that the wheel speed exceeds the electric motor regenerative control starting speed, the electric motor which has been in the drive limit mode by then operates in the regenerative mode, the rotation speed of the drive wheel 43 is lowered to the same level as the driven wheel 42, and the rotation kinetic energy of the drive wheel 43 to be decreased is recovered as the electric energy into the storage batteries 49.

In this embodiment, even when the drive wheel speed is decreased and becomes lower than the electric motor regenerative control starting speed and the electric motor output control starting speed, the electric motors are operated in the regenerative mode. This is because unless the speed of the drive wheel 43 is decreased to some extent, rotations are increased soon, and the regenerative mode is immediately operated accordingly. Thus, chattering might be caused. To avoid it, so-called hysteresis is provided.

Thus, when the drive wheel 43 spins, the output limit (drive limit mode) of the electric motor and the regenerative mode are appropriately used to control so to remedy the spin of the drive wheel 43.

As described above, when the hybrid vehicle of this embodiment is running by both the electric motors and the engine and if one of the drive wheels spins by exceeding a predetermined speed, the powering (rotation output control) of the electric motor connected to the pertinent drive wheel is limited or it is controlled to make the regenerative operation of the electric motor. Thus, a speed reduction operation is made to remedy the spin (skid) of the drive wheel.

Prediction accuracy is high and control accuracy can be enhanced because the output and load of the electric motors can be determined from the number of rotations and the input electric power.

Besides, even when the driving force is continuously controlled, stable control can be made because there is no negative factor such as generation of heat.

And, when the regeneration of electric power is used, the vehicle's energy efficiency can be improved because excessive energy can be recovered.

Thus, the operation of this embodiment is an electrical operation of the electric motor and good in quick response, and secure measures can be taken, and the spin can be remedied securely and quickly. Therefore, stable running can be made even when the engine is driven at a relatively high speed, running performance can be improved, and favorable from a safety standpoint.

As a result, running stability, cruising range and the like as the vehicle even on a bad road are improved, and a hybrid vehicle having an overall high performance can be obtained.

Now, a second embodiment of the third invention will be described with reference to FIG. 17.

The hybrid vehicle of this embodiment uses TCS for controlling the engine in addition to the thresholds in the above first embodiment.

Figure 17:
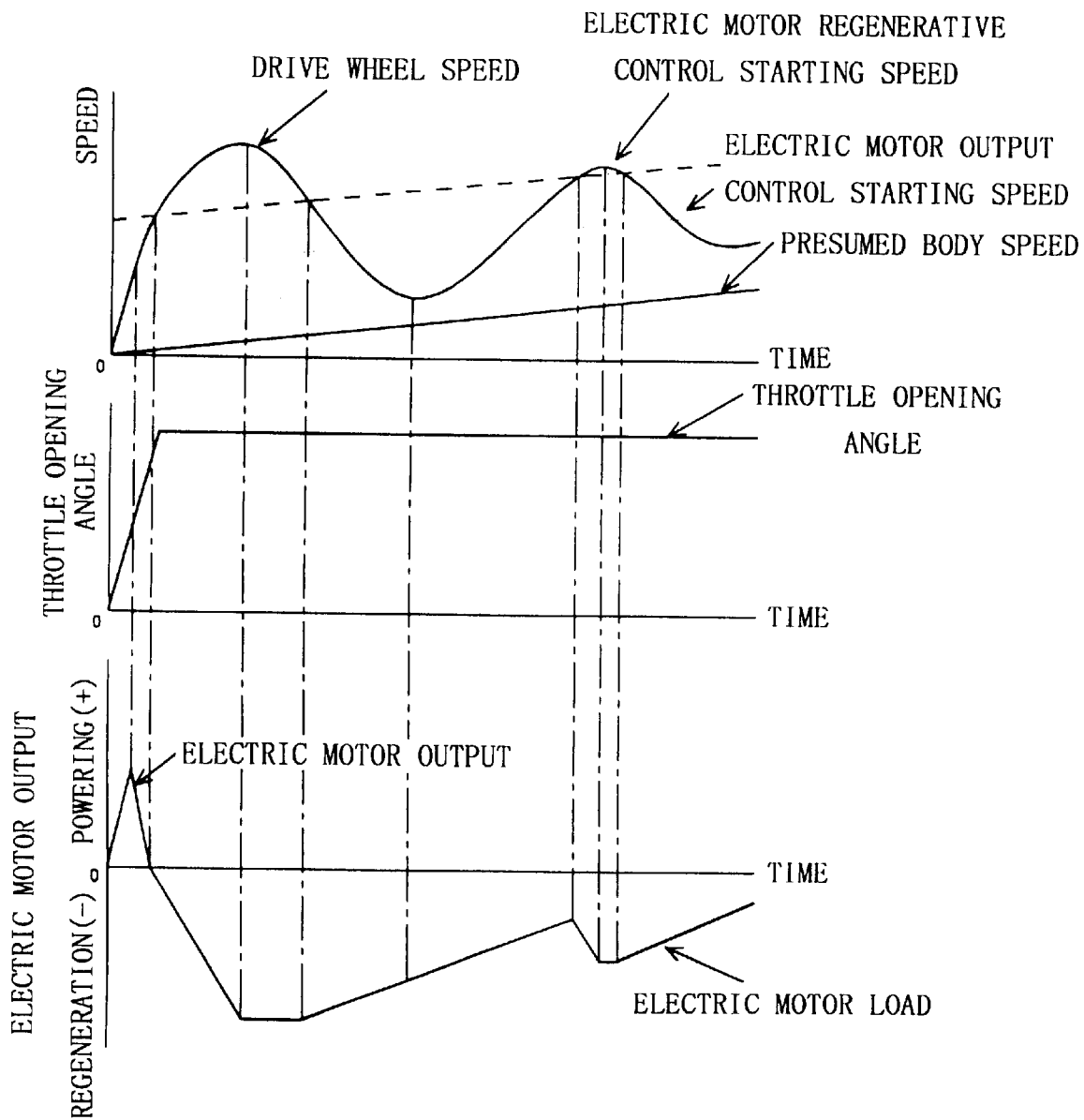
FIG. 17 is a diagram showing an operation principle that the running control of the present invention is combined with a conventional TCS according to the second embodiment of the third invention.

Specifically, as shown in FIG. 17, respective thresholds of an engine control starting speed and a brake control starting speed are added to the structure of the aforesaid first embodiment.

More specifically, with a predetermined engine control starting speed and a brake control starting speed determined as the thresholds, the vehicle is provided with a throttle control device for controlling output of the engine and a second throttle, which is controlled by the throttle control device, arranged upstream of the throttle operated by the driver.

In this case, the electric motor output control starting speed, the electric motor regenerative control starting speed, the engine control starting speed and the brake control starting speed are sequentially provided in the order of increase.

And, when the estimated vehicle body speed calculated as above and the wheel speed of the drive wheel 43 are compared, and if it is judged that the wheel speed exceeds the electric motor output control starting speed, the electric motor output is limited (drive limit mode).

Besides, when a level of spin becomes large, it is judged that the wheel speed exceeds the electric motor regenerative control starting speed, then the electric motor which has been in the drive limit mode then operates in the regenerative mode, the rotation speed of the drive wheel 43 is decreased to the same level as that of the driven wheel 42, and the rotary kinetic energy of the drive wheel 43 with its rotation speed decreased is recovered as the electric energy into the storage batteries 49.

The above described operations are the same as in the above first embodiment, but this embodiment, when the drive wheels are judged to spin and the wheel speed of the drive wheels 43 exceeds the engine control starting speed or the brake control starting speed, the second throttle is controlled or the braking control of the drive wheels is performed.

In this embodiment, when it is judged that the wheel speed of the drive wheel 43 exceeds the engine control starting speed, it is controlled to decrease the opening angle of the second throttle.

Furthermore, when the level of spin increases and it is judged that the wheel speed exceeds the braking control starting speed, the braking control of the drive wheels 43 is performed.

Thus, when the drive wheel 43 spins, the output limit (drive limit mode) of the electric motor, the regenerative mode, the second throttle and the brake are selectively used to control so to remedy the spin of the drive wheels 43.

As described above, according to the hybrid vehicle of this embodiment, when the vehicle is running by both the electric motors and the engine and the drive wheels exceed a predetermined speed and spin, it is controlled that powering (rotation output control) of the electric motor connected to the drive wheel is stopped or the regenerative operation of the electric motor is made, so that the speed is decreased to remedy the spin (skid) of the drive wheel. And, the TCS is added to the structure, so that the spin control can be made more securely and it is convenient because the advantages of each control can be used as required.

In this embodiment, the electric motor output control starting speed, the electric motor regenerative control starting speed, the engine control starting speed and the brake control starting speed are sequentially arranged in the order of increase. Therefore, the electric motor is used before the TCS to control the spin of the drive wheel, and the energy efficiency can be improved further and the running performance can be prevented from lowering.

Now, a third embodiment of the third invention will be described with reference to FIG. 18.

The hybrid vehicle of this embodiment is provided with additional functions that a lateral acceleration (yaw rate) of the vehicle is detected when it is steered to make cornering, and the drive wheels are braked to lower the speed before the vehicle spins in the same way as the aforesaid traction control, thereby controlling the vehicle in the stable condition.

Figure 18:
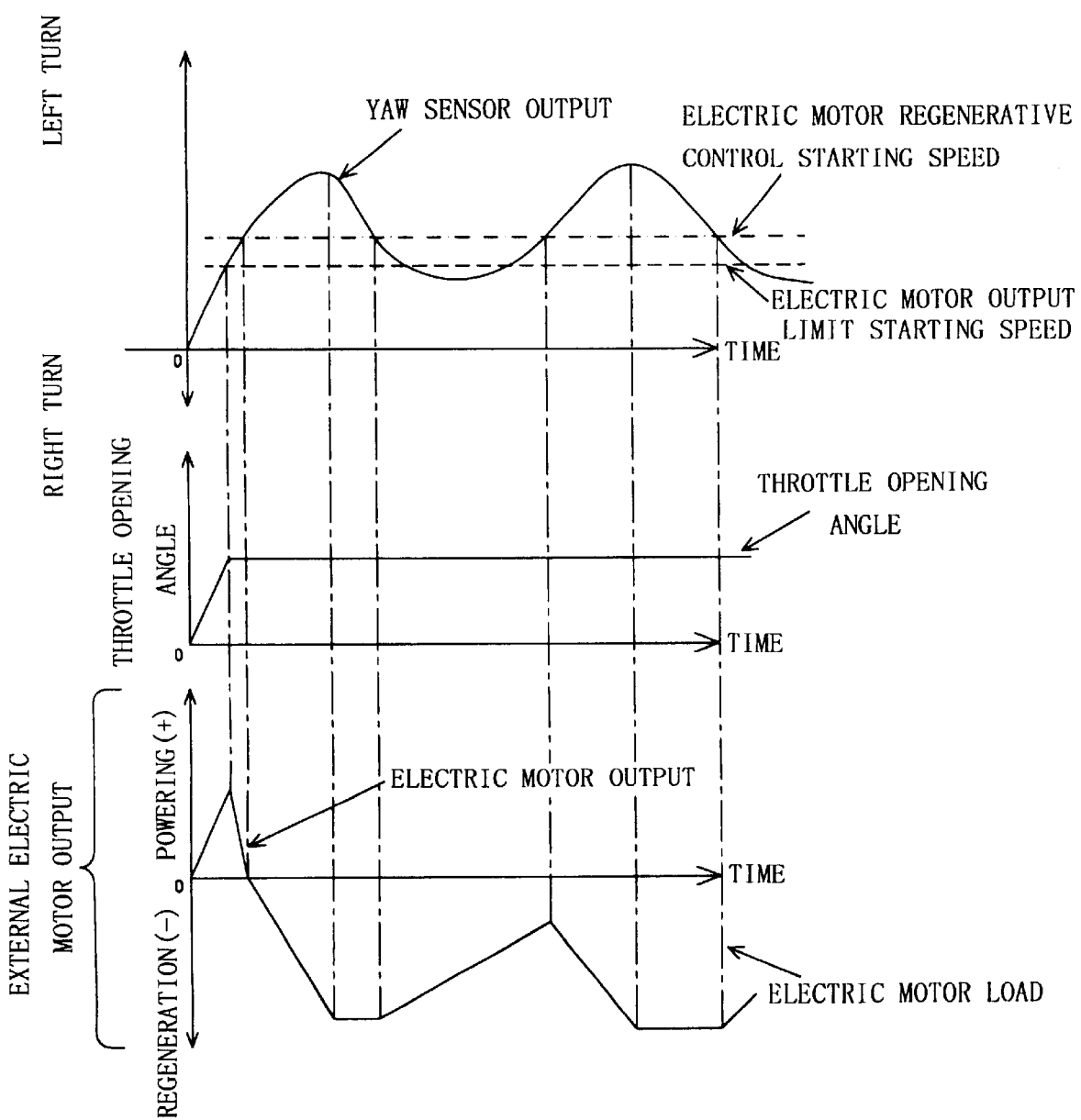
FIG. 18 is a diagram showing a basic operation principle of running control according to a third embodiment of the third invention.
Figure 19:
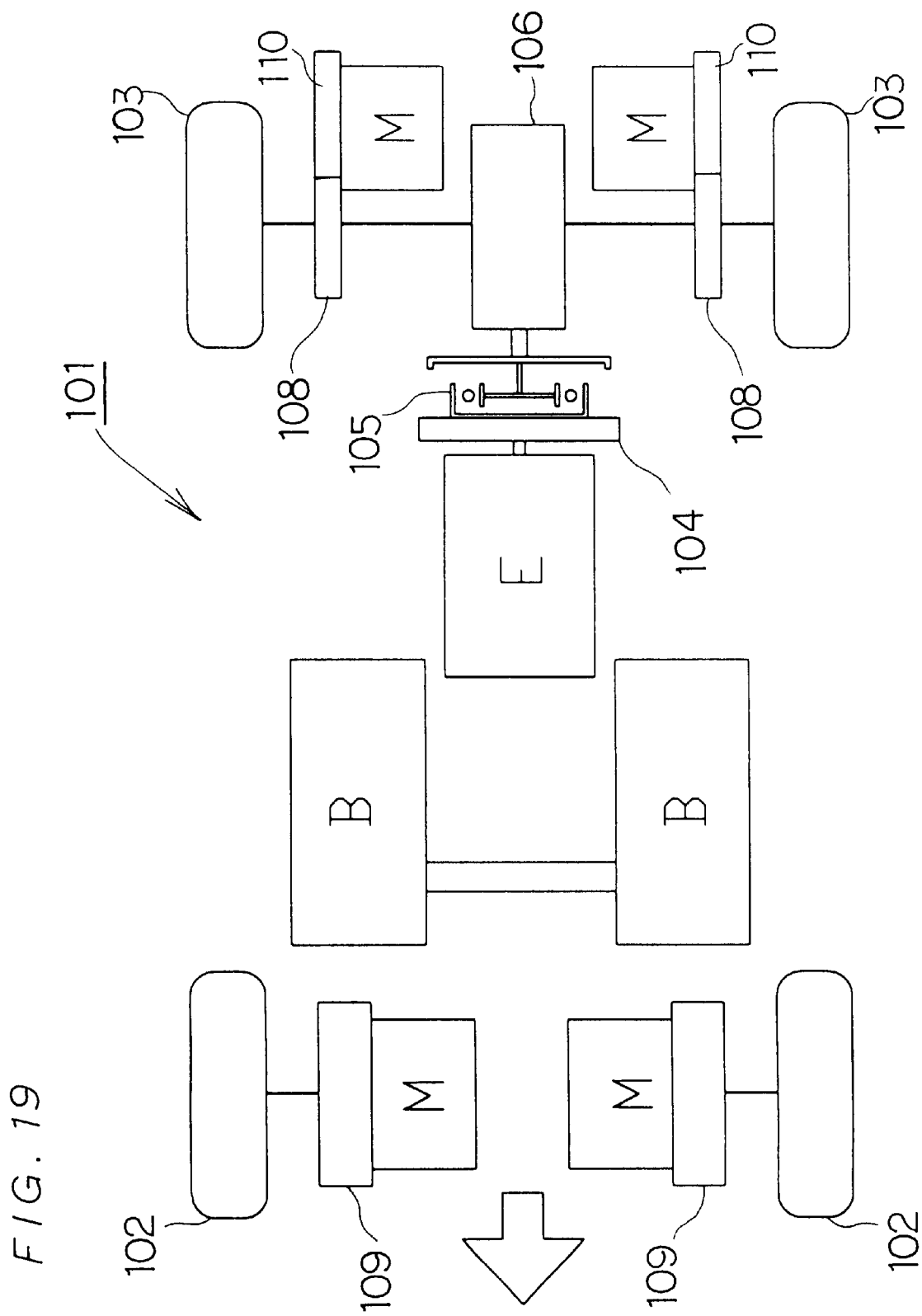
FIG. 19 is a block diagram showing a hybrid vehicle according to an embodiment of a fourth invention.
Figure 20:
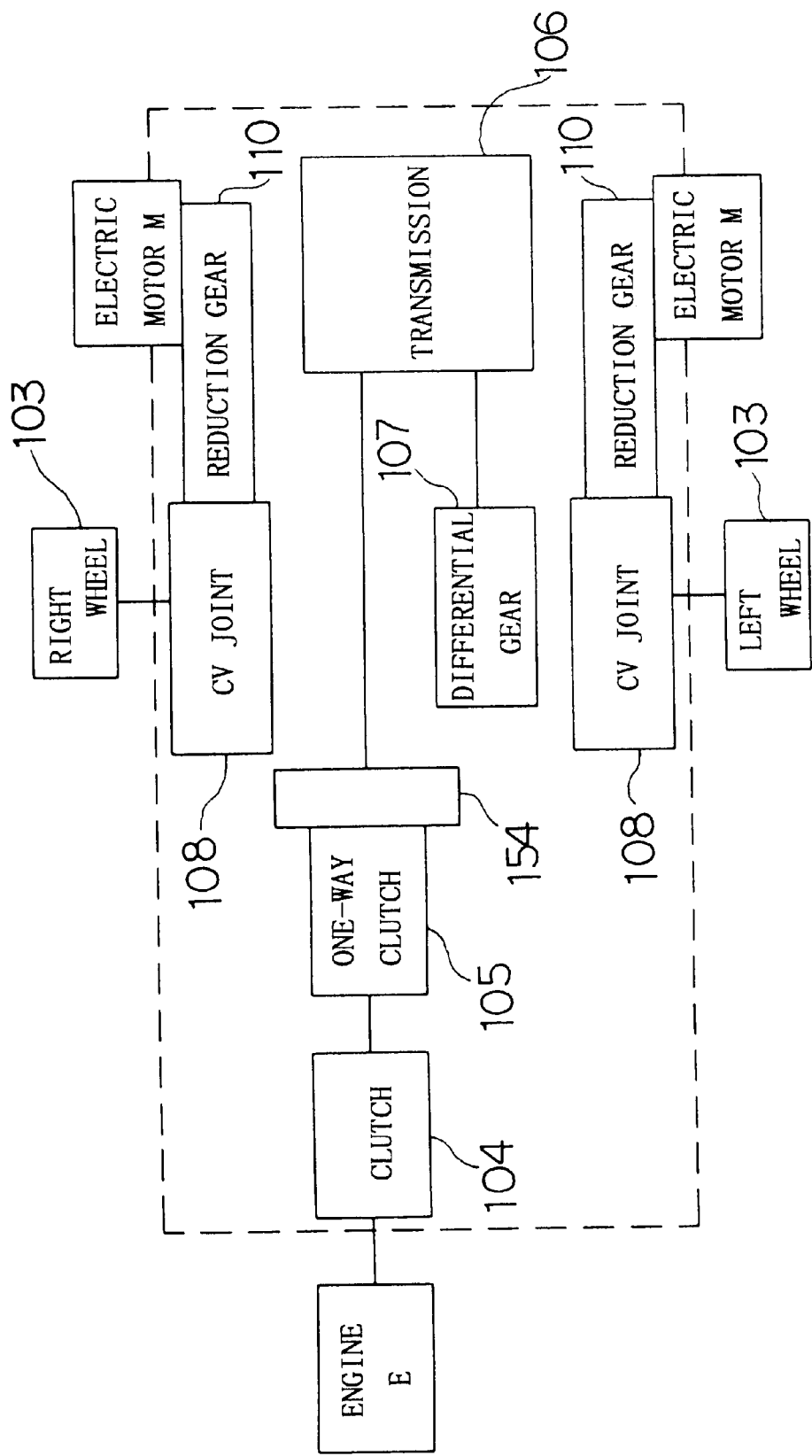
FIG. 20 is a conceptual block diagram mainly showing the structure of a transmission according to an embodiment of a fourth invention.
Figure 21:
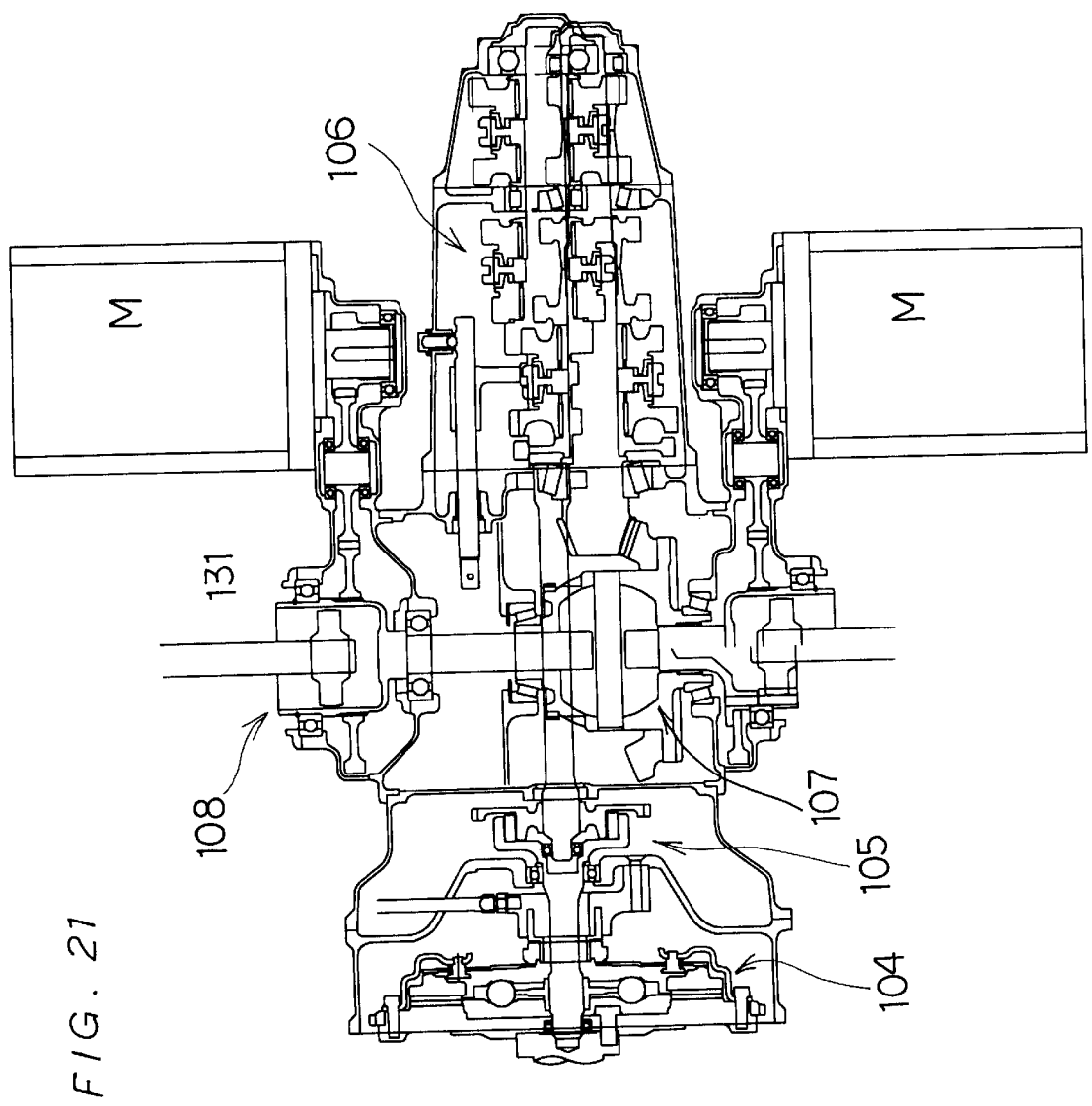
FIG. 21 is a detailed cross sectional diagram showing the structure of the transmission according to the embodiment of the fourth invention.
Figure 22:
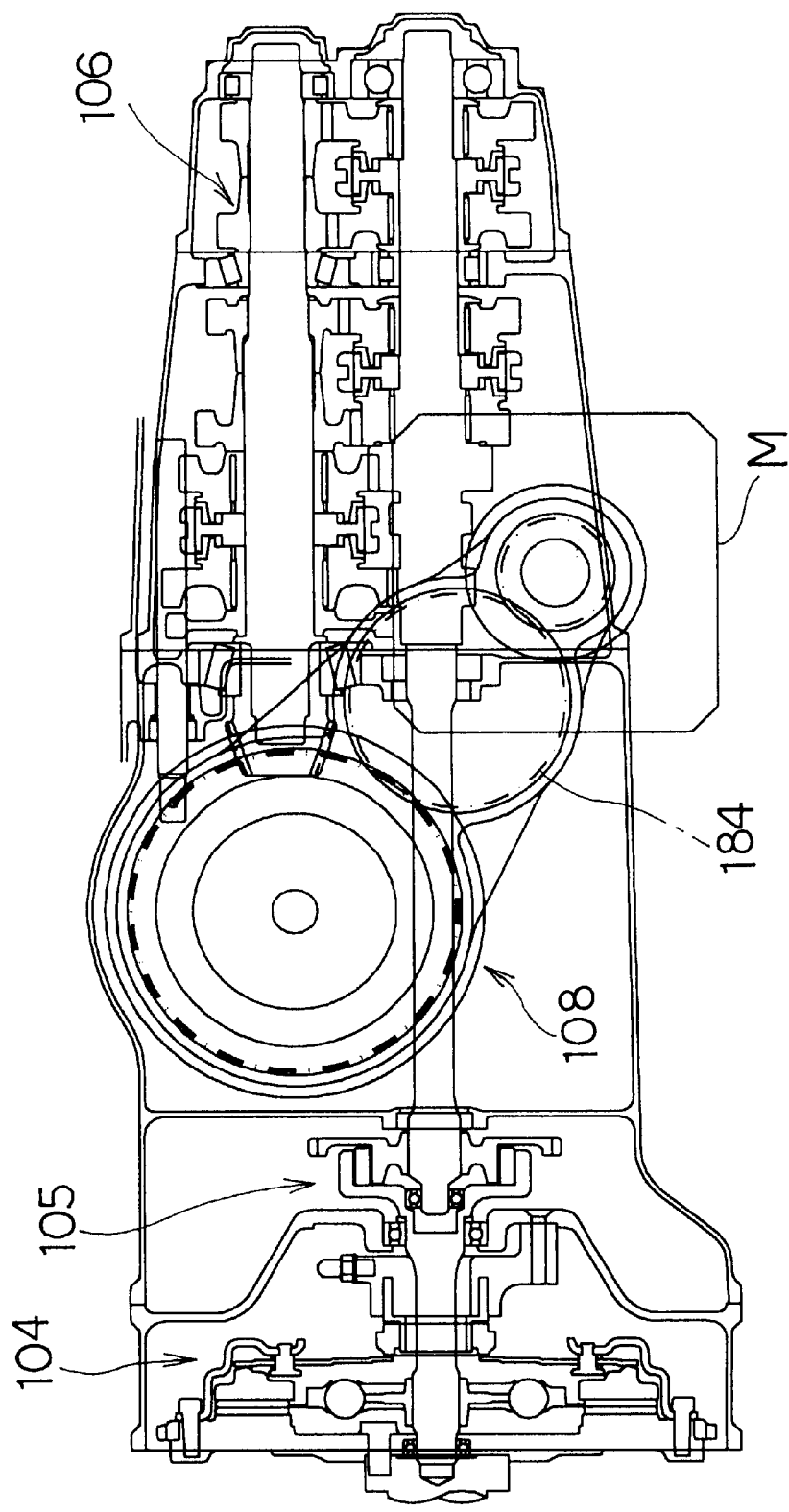
FIG. 22 is a detailed vertical sectional diagram showing the structure of the transmission according to the embodiment of the fourth invention.

Specifically, as shown in FIG. 18, the vehicle includes a yaw sensor for detecting a lateral acceleration of the vehicle and an arithmetic unit which controls the output of the electric motors with predetermined electric motor output control starting yaw sensor output and electric motor regenerative control starting yaw sensor output as the thresholds. When the throttle of the engine is open by the operation effected by the driver, the output control of the electric motors is started, and when the output exceeds the thresholds, the output of the electric motor driving the drive wheel is controlled.

When the accelerator is operated by the driver of the hybrid vehicle 41, the throttle of the engine is open, the engine is driven and the output of the electric motors is also in the drive mode (powering).

In this embodiment, the vehicle is making a left turn, and a steering level and a throttle opening angle are constant. And, when the yaw sensor exceeds a first sensor level, it is judged that a spin may be caused, and the output of the electric motors is limited (drive limit mode).

Besides, when a level of the lateral acceleration increases and it is judged that the yaw sensor exceeds a second sensor level, the electric motor which has been in the drive limit mode then operates in the regenerative mode, the rotation speed of the drive wheel 3 is decreased, and the rotary motion energy of the drive wheel 43 decreased is recovered as the electric energy into the storage batteries 49.

In this embodiment, it is designed that even when the drive wheel speed is decreased to be smaller than the electric motor regenerative control start yaw sensor output and the electric motor output control start yaw sensor output, the electric motor is operated in the regenerative mode. This is because unless the speed of the drive wheel 43 is decreased to some extent, rotations are increased soon, and the regenerative mode is immediately operated accordingly as described above. Thus, chattering might be caused. To avoid it, hysteresis is provided.

Thus, when the drive wheel 43 spins, the electric motor output limit (drive limit mode) and the regenerative mode are appropriately used as required so to control to prevent the drive wheels 43 from spinning.

As described above, according to the hybrid vehicle of this embodiment, when the vehicle is running by the electric motors or by both the electric motors and the engine, and one of the drive wheels exceeds a predetermined turning acceleration, it is controlled to stop the powering (rotation output control) of the electric motor connected to that drive wheel or to make the regenerative operation of the electric motor, so that the speed is decreased to prevent the drive wheel from spinning.

In the same way as in the aforesaid embodiment, the operation of this embodiment is an electrical operation of the electric motor, so that it is good in quick response, can take secure measures, and remedies the spin securely and quickly. Therefore, stable running can be made even when the engine is driven at a relatively high speed, running performance can be improved, and it is favorable from a safety standpoint.

As a result, the running stability, cruising range and the like as the vehicle even on a bad road are improved, and a hybrid vehicle having an overall high performance can be obtained.

The above embodiment has been described with reference to the left turning of the vehicle, but it is to be understood that the same can be applied to the right turning of the vehicle.

An embodiment of a fourth invention will be described with reference to the drawings.

In FIG. 19 to FIG. 22, a hybrid vehicle 101 of this embodiment includes running wheels (front wheels 102 and rear wheels 103), which are suspended at the front and rear of the main frame of an unillustrated vehicle body in the same way as in the previous embodiment. The front wheels 102 are steered by the driver through the steering wheel, and the front and rear wheels 102, 103 or the rear wheels 103 are rotationally driven to run the vehicle. As its drive source, an engine drive system based on a conventional internal combustion engine E and an electrical drive system based on electric motors M, M are mounted, and a hybrid system controller (not shown), which switches them or operates in cooperation by means of an operation lever, is provided.

A clutch 104, a one-way clutch 105 and a transmission 106 are mounted downstream of the engine E, and a driving force is transmitted from the transmission 106 to the rear wheels 103 through a differential gear 107 and CJ joints 108. Symbol B indicates a storage battery.

Unillustrated fuel tank for supplying a fuel to the engine E and engine auxiliaries such as a fuel pump, piping, engine cooling device are arranged in the periphery of the engine E in the same way as in the aforesaid embodiment.

The electric motors M for rotating the front and the rear wheels 102, 103 are respectively mounted to transmit their rotation forces through respective reduction gears 109, 110.

The hybrid vehicle 101 of this embodiment has as its operation modes an engine running mode for outputting a driving force of the engine E according to the stepped-on quantity of the accelerator pedal by the driver, an engine/electric motor-based running mode for outputting the driving forces of both the engine E and the electric motors M (hereinafter the engine running mode and the engine/electric motor-based running mode are referred to as the HEV mode in the same way as the above described embodiment), and an electric motor running mode (hereinafter called EV mode) for outputting the traction of the electric motor M only.

As described previously, the engine running mode is a mode that an throttle opening angle is varied according to a stepped-on quantity of the accelerator pedal by the driver to increase the torque of the engine E. The engine/electric motor-based running mode is a mode that the driving forces of the electric motors M are also used together with the driving force of the engine E and the electric current values of the electric motors are increased to increase the motor torque according to the stepped-on quantity of the accelerator pedal by the driver. The electric motor running mode is a mode to drive the vehicle by the driving forces of the electric motors M only as described above, and the electric current values of the electric motors are increased to increase the motor torque according to the stepped-on quantity of the accelerator pedal by the driver. In this mode, the motor torque values with respect to the throttle opening angle can be made larger because the vehicle is driven by the motors only.

In the HEV mode, the revolutions of the engine E are transmitted to the clutch 104, the one-way clutch 105, the transmission 106, the differential gear 107 and the CV joints 108 so to drive to rotate the rear wheels 103 as described above.

In the HEV mode, the throttle opening angle is variable according to the stepped-on quantity of the accelerator pedal by the driver, and when the electric motors M are used together, the electric current values of the electric motors M are also variable according to the stepped-on quantity of the accelerator pedal by the driver, but a magnitude of change is calculated by a controller so to produce an appropriate rotation driving force.

In the EV mode, the electric current values of the electric motors M are variable according to the stepped-on quantity of the accelerator pedal by the driver, and an optimum rotation driving force is output according to the calculation made by the controller.

In both the HEV mode and the EV mode, when the vehicle is running, for example, a long downward slope, the rotations of the front and rear wheels 102, 103 are converted from the kinetic energy into the electric energy by using the electric motors M, M as the generators, and the electricity generated by the electric motors M, M can be charged into the storage batteries B. When the regeneration of electric power is used, excessive energy can be recovered, so that the energy efficiency of the vehicle is improved.

Figure 23:
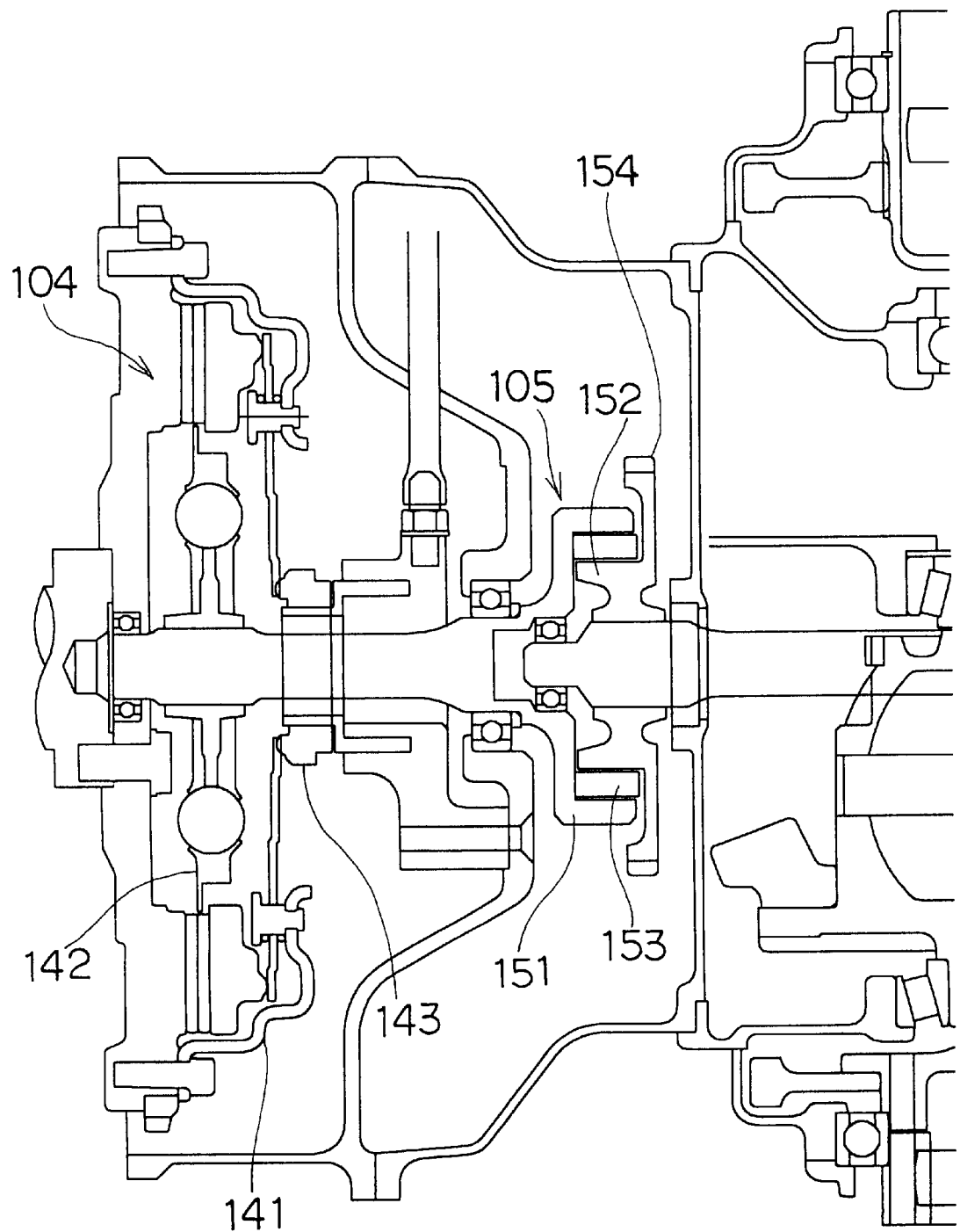
FIG. 23 is an enlarged cross sectional diagram showing clutch and one-way clutch portions according to the embodiment of the fourth invention.

As shown in FIG. 23 which is an enlarged view of the clutch of the above hybrid vehicle 101 of this embodiment, the one-way clutch 105, which includes an outer lace 151, an inner lace 152 and a sprag 153 arranged between them, is mounted downstream of the clutch 104. This one-way clutch 105 transmits the engine torque in a drive direction only.

By providing the one-way clutch 105 which transmits the engine torque in the drive direction only as described above, a transmission route which reversely transmits the rotations of the wheels to the engine is interrupted by this one-way clutch 105, so that the kinetic energy of the vehicle can be recovered to its maximum by the regenerative braking function of the electric motor. As a result, the kinetic energy is not lost as a mechanical loss of the engine as before, and the energy efficiency can be improved.

Figure 24:
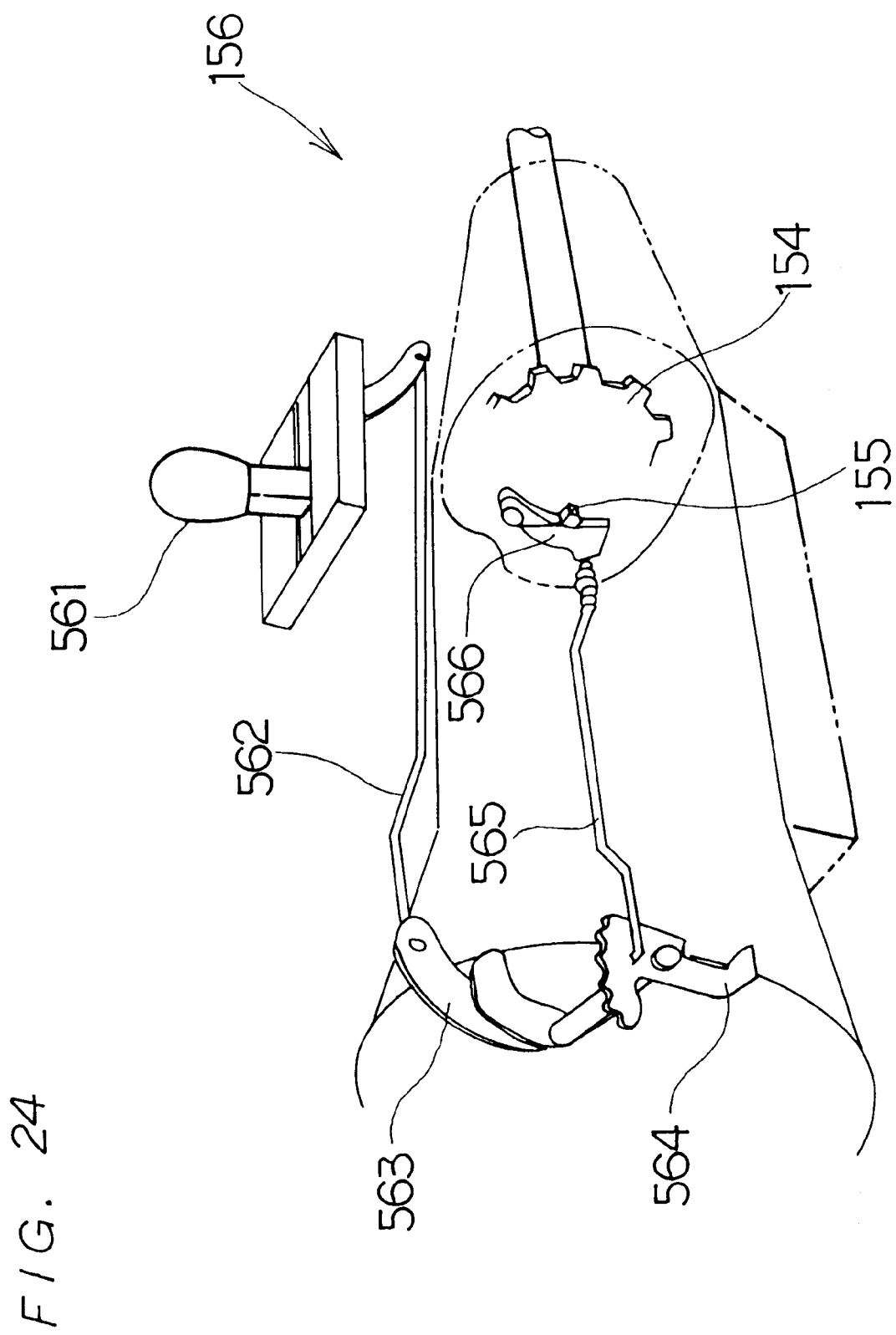
FIG. 24 is a conceptual block diagram showing a parking mechanism.

In addition, in this embodiment, a parking gear 154 is integrally provided on the outer lace 151 on the opposite side of the clutch, namely downstream of the one-way clutch 105, and as shown in FIG. 24, a parking mechanism 156 having a hook 155 which is engaged with or disengaged from the parking gear 154 is also provided. This parking mechanism 156 may be a conventional one. For example, it is configured that the operation by a select bar 561 is transmitted to a parking pole 566 through a select rod 562, a manual lever 563, a manual plate 564 and a parking rod 565, and the hook 155 attached to the parking pole 566 is engaged with or disengaged from the parking gear 154.

In FIG. 23, the clutch 104 is arranged upstream (left side in the drawing) of the one-way clutch 105. Reference numeral 141 is a clutch assembly, 142 is a clutch disk, and 143 is a clutch release cylinder. Generally, a clutch drum is integrally formed with the engine, so that when a conventional engine is used, the one-way clutch 105 is located downstream of the clutch 104, but the one-way clutch 105 may be arranged upstream of the clutch 104. In this sense, the one-way clutch is provided next to the clutch.

By providing the aforesaid one-way clutch 105, the function of securely stopping the vehicle when it is parked is lowered. But, the function of a parking brake can be provided by arranging the parking gear 154 as in this embodiment and having the parking mechanism 156 and which has the hook 155 to engage with or disengage from the parking gear, so that the parking gear is locked by the hook to prevent the rotations of the shaft and the wheels connected to the shaft.

Figure 25:
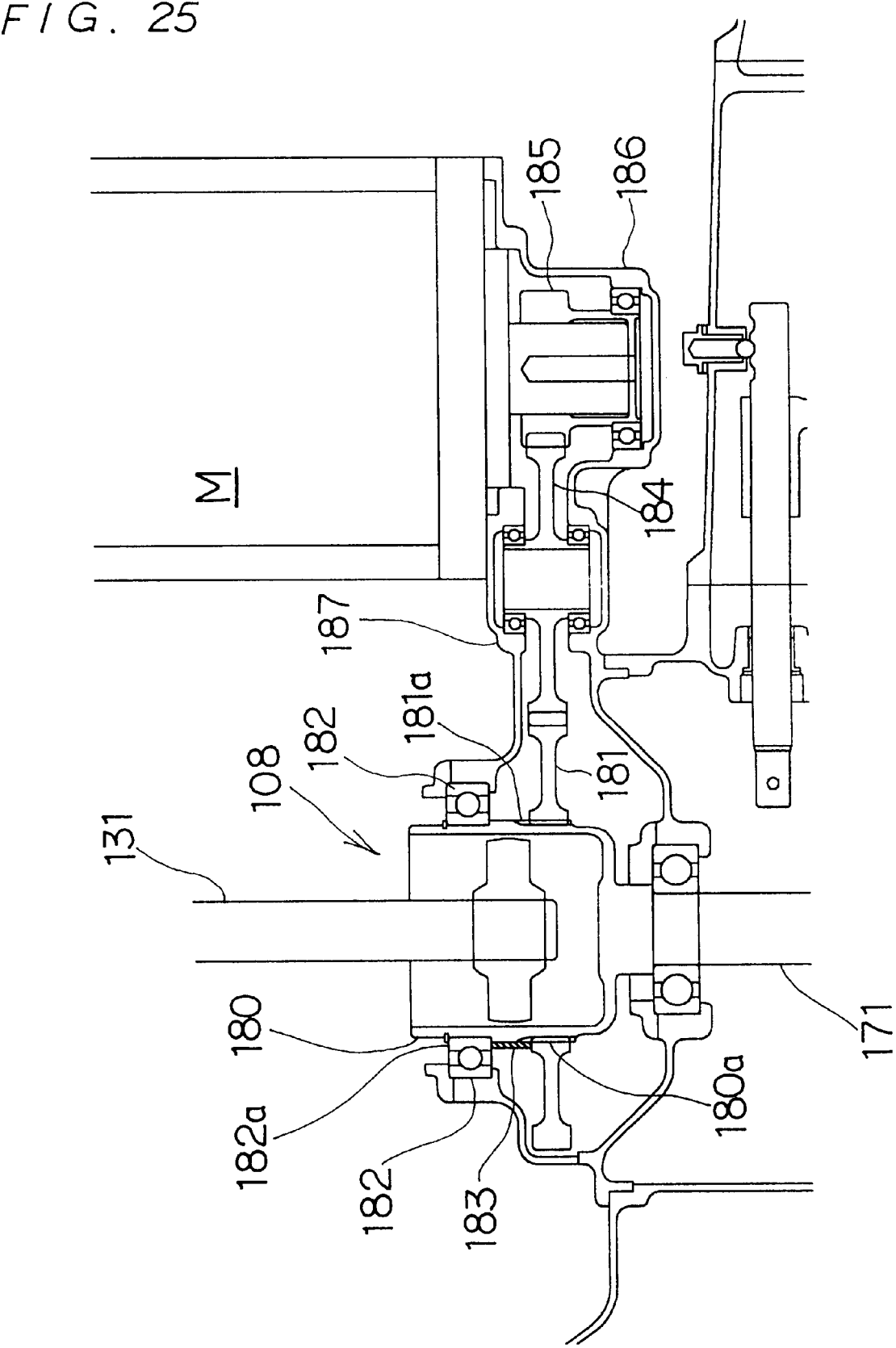
FIG. 25 is an enlarged cross sectional diagram showing a CV joint position according to the embodiment of the fourth invention.

In this embodiment, as shown in FIG. 25, a shaft 131 of the rear wheels 103 is engaged with the CV joint 108 and a CV joint housing 180. And, the CV joint housing 180 is connected to an output shaft 171 of the differential gear 107. Thus, the driving force from the engine E is transmitted to the CV joint housing 180, and a power transmission gear 181 is attached to the CV joint housing 180 to transmit the driving force from the electric motors M to the CV joint housing 180 through the power transmission gear 181.

More specifically, a ridge 180a is integrally formed on the outer periphery of the CV joint housing 180, and a spline 181a is formed on the inner wall of the power transmission gear 181 so to fit to the ridge 180a. After assembling them, the movement of the power transmission gear 181 in a thrust direction is fixed by an inner lace 182a of a ball bearing 182 for supporting the CV joint through a collar 183.

Thus, the CV joint housing 180 is determined to be the transmission route from the electric motors M, so that the motor torque can be transmitted to the drive shaft in a distance as short as possible, and a position of arranging the electric motors M can be determined with enhanced flexibly. Therefore, since the power of the electric motors M can be transmitted in the vicinity of the drive wheel (rear wheel 103) without through the differential gear 107, the space of mounting the electric motors M can be saved, and the number of components can be decreased.

Since the rotation of the electric motors M corresponds to that of the wheels in a ratio of one to one, the control of rotations (e.g., ABS, TCS, etc.) of the wheels by the electric motors M, M attached to the respective wheels 102, 103 is facilitated.

In this embodiment, an intermediate gear 184 is interposed between the power transmission gear 181 and the electric motors M to decrease the number of rotations of the electric motors M. A drive gear 185 is fixed to the output shaft of the electric motors M, the intermediate gear 184 is engaged with the drive gear 185, and the intermediate gear 184 is engaged with the power transmission gear 181.

Generally, the number of rotations of the electric motors is larger than that of the wheels, so that appropriate motor torque can be transmitted by providing a decelerating mechanism (corresponding to the reduction gear 110 of FIG. 19 and FIG. 20) as in this embodiment.

As shown in FIG. 25, deceleration gear casings 186, 187 for housing the power transmission gear 181, the intermediate gear 184 and the drive gear 185 are provided. The deceleration gear casings 186, 187 serve to mount the electric motors M and the intermediate gear 184 and also to be a side cover of the transmission casing. Therefore, they contribute for reduction of the number of components and the weight of the structure.

According to the above described embodiment, a manual transmission mechanism efficient and optimum for the hybrid vehicle can be obtained.

INDUSTRIAL APPLICABILITY

The hybrid vehicle according to the present invention is provided with improved running efficiency and performance, so that it is suitable to be used as a practical vehicle which can reduce an amount of carbon dioxide emissions.

What is claimed is:

1. A hybrid vehicle including an engine operated by burning a fuel and a plurality of electric motors operated by electric energy, characterized in that:

at least one pair of right and left wheels are linked with both the engine and the motors, and when either of the wheels skids to rotate excessively while the vehicle is driven by the engine, a motor connected to the skidded wheel is made to effect regenerative operation to brake the skidded wheel to remedy the skid of the skidded wheel, wherein the motors are disposed to be drivable for recharging by the engine, and the wheels linked to the engine are mounted to be disengageable from the engine.

2. The hybrid vehicle according to claim 1, wherein running traction which becomes insufficient due to the skid is supplemented by driving the other wheel by the motor by using electric energy recovered by the regenerative operation.

3. A hybrid vehicle including an engine operated by burning a fuel and a plurality of electric motors operated by electric energy, characterized in that:

at least one pair of right and left wheels are linked with both the engine and the motors, and when either of the wheels skids to rotate excessively while the vehicle is driven by the engine, a motor connected to the skidded wheel is made to effect regenerative operation to brake the skidded wheel to remedy the skid of the skidded wheel, wherein the motor driving force is distributed to compensate the traction balance of the respective wheels lowered due to the skid.

4. A hybrid vehicle including an engine operated by burning a fuel and electric motors operated by electric energy, characterized in that:

a transmission includes a first operation section to change gears of at least an engine running system and a second operation section to switch between forward and backward drives of an electric motor running system;

both the operation sections have a neutral lever position formed commonly; and an operation lever is provided to be operable in both the operation sections so to alternatively switch between the engine running system and the electric motor running system.

5. The hybrid vehicle according to claim 4, wherein a seesaw switch, which is switched when the operation lever passes by, is provided between the neutral lever position of the engine running system and the neutral lever position of the electric motor stem in the commonly formed neutral lever position.

6. The hybrid vehicle according to claim 4 or 5, wherein the operation lever is provided with a switch for starting the engine.

7. The hybrid vehicle according to claim 5, wherein the engine running system is provided with a clutch, the seesaw switch is switched by shifting the operation lever from the first operation section to the second operation section to stop the engine and to fix the clutch in an open state, and the seesaw switch is switched by shifting the operation lever from the second operation section to the first operation section to release the clutch from the open state.

8. The hybrid vehicle according to claim 7, wherein even when the operation lever is shifted from the second operation section to the first operation section, the operation lever cannot be shifted into the first operation section as the seesaw switch is fixed in the fixed state when the engine is not operating.

9. The hybrid vehicle according to claim 4, wherein the engine running system is provided with a clutch, and the electric motors are turned off when the clutch is in an open state.

10. The hybrid vehicle according to claim 4, wherein the engine running system is provided with a semi-automatic transmission or a full automatic transmission, and the electric motors are operated by operating an accelerator pedal even if the clutch is in the open state.

11. A hybrid vehicle including an engine operated by burning a fuel and electric motors operated by electric energy, characterized by:

a wheel speed sensor connected to each driven wheel; and an arithmetic unit which calculates a vehicle speed from a signal output from the wheel speed sensor, calculates a wheel speed of a drive wheel from the number of rotations of an associated electric motor, and controls output of the associated electric motor with a predetermined electric motor output control starting speed and electric motor regenerative control starting speed determined as thresholds.

12. A method of controlling running of a hybrid vehicle including an engine operated by burning a fuel and electric motors operated by electric energy, characterized in that:

the vehicle has a wheel speed sensor connected to each driven wheel and an arithmetic unit which calculates a vehicle speed from a signal output from the wheel speed sensor, calculates a wheel speed of a drive wheel from the number of rotations of the an associated electric motor, and controls output of the associated electric motor with a predetermined electric motor output control starting speed and electric motor regenerative control starting speed determined as thresholds; and output control of the associated electric motor is started when an engine throttle is opened by the driver, a vehicle speed estimated by calculating and the wheel speed of the drive wheel are compared, and when it is judged that the drive wheel is spinning, output of the associated electric motor which drives that drive wheel is controlled.

13. The method of controlling running of a hybrid vehicle according to claim 12, wherein:

the vehicle is provided with a throttle control device for controlling output of the engine and a second throttle controlled by the throttle control device and arranged upstream of the throttle operated by the driver with a predetermined engine control starting speed and brake control starting speed determined as thresholds; and the vehicle speed estimated by calculating and the wheel speed of the drive wheel are compared, and when it is judged that the drive wheel is spinning and the wheel speed of the drive wheel exceeds the engine control starting speed or a brake control starting speed, the second throttle is controlled or the braking control of the drive wheel is performed.

14. The method of controlling running of a hybrid vehicle according to claim 13, wherein the electric motor output control starting speed, electric motor regenerative control starting speed, engine control starting speed and brake control starting speed are sequentially provided in the order of increasing speed.

15. A hybrid vehicle including an engine operated by burning a fuel and electric motors operated by electric energy, characterized by:

a yaw sensor for detecting a lateral acceleration of the vehicle; and an arithmetic unit for controlling output of the electric motors with a predetermined electric motor output control starting yaw sensor output and electric motor regenerative control starting yaw sensor output determined as thresholds.

16. A method of controlling running of a hybrid vehicle including an engine operated by burning a fuel and electric motors operated by electric energy, characterized in that:

the vehicle is provided with a yaw sensor for detecting a lateral acceleration of the vehicle and an arithmetic unit for controlling output of the electric motors with a predetermined electric motor output control starting yaw sensor output and electric motor regenerative control starting yaw sensor output determined as thresholds; and output control of the electric motors is started when the engine throttle is opened by the driver, and output of the electric motors driving the drive wheels is controlled when it exceeds the thresholds.

17. A hybrid vehicle including an engine operated by burning a fuel and electric motors operated by electric energy, and a clutch provided between the engine and a transmission, characterized in that a one-way clutch is arranged next to the clutch; and the one-way clutch transmits engine torque in a drive direction only.

18. The hybrid vehicle according to claim 17, wherein the shaft of the drive wheel is linked with a CV joint and a CV joint housing, and a power transmission gear is fitted to the CV joint housing to transmit a driving force from the electric motor to the drive wheel through the power transmission gear.

19. The hybrid vehicle according to claim 18, wherein an intermediate gear is interposed between the power transmission gear and the electric motor to decrease the number of rotations of the electric motor.

20. The hybrid vehicle according to claim 17, wherein a parking gear is arranged downstream of the one-way clutch, and a parking mechanism having a hook for engaging with or disengaging from the parking gear is provided.

* * * * *